United States Patent [19]
Podgorny et al.

[11] Patent Number: 6,078,948
[45] Date of Patent: Jun. 20, 2000

[54] PLATFORM-INDEPENDENT COLLABORATION BACKBONE AND FRAMEWORK FOR FORMING VIRTUAL COMMUNITIES HAVING VIRTUAL ROOMS WITH COLLABORATIVE SESSIONS

[75] Inventors: Marek Podgorny, DeWitt; Lukasz Beca, Syracuse, both of N.Y.; Gang Cheng, Nashua, N.H.; Geoffrey C. Fox, Jamesville, N.Y.; Tomasz Jurga, Syracuse, N.Y.; Konrad Olszewski, Syracuse, N.Y.; Piotr Sokolowski, Syracuse, N.Y.; Krzysztof Walczak, Poznan, Poland

[73] Assignee: Syracuse University, Syracuse, N.Y.

[21] Appl. No.: 09/017,840

[22] Filed: Feb. 3, 1998

[51] Int. Cl.[7] .................................................. G06F 15/163
[52] U.S. Cl. ........................ 709/204; 709/205; 709/217; 709/219; 709/227
[58] Field of Search .................................... 709/204, 205, 709/217, 219, 300, 302, 303, 304, 101, 102, 227, 228, 229

[56] References Cited

U.S. PATENT DOCUMENTS

| | | | |
|---|---|---|---|
| 5,515,491 | 5/1996 | Bates et al. ............................... | 395/155 |
| 5,861,883 | 1/1999 | Cuomo et al. ........................... | 345/326 |
| 5,918,010 | 6/1999 | Appleman et al. ...................... | 709/203 |
| 5,941,945 | 8/1999 | Aditham et al. ......................... | 709/205 |

OTHER PUBLICATIONS

Garfunkel et al.; "HP SharedX: A Tool for Real–Time Collaboration"; (1994);*Hewlett–Packard Journal*; pp. 23–36.

Hall et al.; "Corona: A Communication Service for Scalable, Reliable Group Collaroration Systems," Software Systems Research Laboratory, The Univ. of Michigan; 10 page.

Holtman, K.; "The Futplex System"; (1996); Proceedings of the ERCIM Workshop on CSCW and the Web; Sankt Augustin, Germany.

LaLiberte et al.; "A Protocol for Scalable Group and Public Annotations"; (9 pages).

Lee, et al.; "Supporting Multi–User, Multi–Applet Workspaces in CBE"; Software Systems Research Laboratory, The Univ. of Michigan; (10 pages).

Payne, et al.; "The EMSL Collaborative Research Environment (CORE)—Collaboration via the World Wide Web"; Environmental Molecular Sciences Laboratory (9 pages).

(List continued on next page.)

*Primary Examiner*—Dung C. Dinh
*Assistant Examiner*—Abdullahi E. Salad
*Attorney, Agent, or Firm*—Hale and Dorr

[57] ABSTRACT

Platform-independent collaboration backbone and framework for forming virtual communities having virtual rooms with collaborative sessions. Demon logic is embedded in a room page as downloadable platform-independent instructions. The demon, when downloaded, is caused to be in communication with control logic and an application, which, for example, may itself be downloadable. The downloaded demon is also in communication with a server. The server is in communication with similarly-arranged, though not necessarily identical, clients, which for example may have the downloaded demon but a different arrangement of applications. The application at a first and second client node may collaborate by causing their respective demons to send messages from a predefined protocol to the server, which in turn will forward them to other relevant demons. Some of the messages are control messages which facilitate certain collaborative actions, such as joining a session or entering a room. Other messages carry meaning only to the applications. The collaborating applications need not be identical, and the system provides minimal constraints on developers. For example, there is no requirement that the applications operate off an identical data model. Rooms may be organized into communities, which for example may specify certain commonality among rooms, such as common user-authentication. When a user changes from one room to another, if the new room is in a different community, the user will need to go through user authentication-procedures of the new community to permit access.

37 Claims, 13 Drawing Sheets

OTHER PUBLICATIONS

Prakas et al.; "DistView: Support for Building Efficient Collaborative Applications Using Replicated Objects"; Software Systems Research Laboratory, The Univ. of Michigan; (12 pages).

Rutgers University; "The DISCIPLE System"; 1997 Project Summary; DARPA ITO Sponsored Research.

Univ. of California, Santa Cruz; "Nomadic Collaborative Visualization and Imprecise Information"; 1997 Project Summary; DARPA ITO Sponsored Research.

Univ of New Mexico; Distributed Self–Evolving Groups:; 1997 Project Summary; DARPA ITO Sponsored Research.

The Open Group Research of the Open Software Foundation, Inc.; "Distributed Clients for the WWW"; 1997 Project Summary; DARPA ITO Sponsored Research.

The MITRE Corporation; "Data Collection and Evaluation for Collaborative Work Enviroments"; 1997 Project Summary; DARPA ITO Sponsored Research.

The Broad of Trustees, Univ. of Illinois; "Virtue: Direct Software Manipulation"; 1997 Project Summary; DARPA ITO Sponsored Research.

SRI International; "Timely Information Distrubition in Dynamic Collaborative Enviroments" 1997 Project Summary; DARPA ITO Sponsored Research.

SRI International; "QOS Middleware for Group Applications"; 1997 Project Summary; DARPA ITO Sponsored Research.

Mass. Institute of Technology; "Building an Intelligent Information Infrastructure"; 1997 Project Summary; DARPA ITO Sponsored Research.

Cornell University; "MediaNet: A High Performance Platform Network Media Processing"; 1997 Project Summary; DARPA ITO Sponsored Research.

Carnegie Mellon Univ. and Univ. of Pittsburgh; "Visualizations and Briefings that Acquire, Portray and Communicate Experience"; 1997 Project Summary; DARPA ITO Sponsored Research.

Carnegie Mellon Univ.; "Informedia Experience–on–Demand: Capturing, Integrating and Communicating Experiences Across People, Time and Space"; 1997 Project Summary; DARPA ITO Sponsored Research.

Carnegie Mellon Univ.; "CSpace—Collaboration Information Management"; 1997 Project Summary; DARPA ITO Sponsored Research.

BBN Systems and Technologies; "Integration of CVIM Technologies"; 1997 Project Summary; DARPA ITO Sponsored Research.

BBN Systems and Technologies; "Rough 'n' Ready: A Meeting Recorder and Browser"; 1997 Project Summary; DARPA ITO Sponsored Research.

Carnegie Mellon University; "Virtual Work Rooms"; 1997 Project Summary; DARPA ITO Sponsored Research.

Univ. of Illinois–NCSA; Framework for Integrated Synchronous and Asynchronous Collaboration (ISAAC); 1997 Project Summary; DARPA ITO Sponsored Research.

Hughes Research Laboratories; "Human–Computer Symbiotes: Cyberspace Entities for Active and Indirect Collaboration"; 1997 Project Summary; DARPA ITO Sponsored Research.

Carnegie Mellon University; "Sharing Viewpoints, Object, and Animations"; 1997 Project Summary; DARPA ITO Sponsored Research.

Crystaliz Inc.; "Multi–Tiered Asynchronous Workspaces (MAW)"; 1997 Project Summary; DARPA ITO Sponsored Research.

Univ. of California, Berkeley; "Scalable Architecture"; 1997 Project Summary; DARPA ITO Sponsored Research.

Hughes Research Laboratories, Inc. "Semantic Multicast"; 1997 Project Summary; DARPA ITO Sponsored Research.

Mass. Institute of Technology; "World Wide Web: Evolving to Information Infrastructure"; 1997 Project Summary ; DARPA ITO Sponsored Research.

Mass. Institute of Technology; "Computational Video for Collaborative Applications"; 1997 Project Summary; DARP ITO Sponsored Research.

DARPA Information Technology Office (ONR 66001–96–C–8507)—IC&V Program; "Collaborative Bus".

DARPA (Chart) Intelligent Collaboration & Visualization.

FIG. 5 (session exists)

PLATFORM-INDEPENDENT COLLABORATION BACKBONE AND FRAMEWORK FOR FORMING VIRTUAL COMMUNITIES HAVING VIRTUAL ROOMS WITH COLLABORATIVE SESSIONS

The government may have rights regarding this invention pursuant to terms of following contracts:

DoD High Performance Computing Modernization Program ARL Major Share Resource Center through Programming Environment and Training (PET). Supported by Contract No.: DAHC 94-96-C-0010 with Raytheon Systems Company.

DoD High Performance Computing Modernization Program ASC Major Share Resource Center through Programming Environment and Training (PET). Supported by Contract No.: DAHC 94-96-C-0005 with Nichols Research Corp.

DoD High Performance Computing Modernization Program CEWES Major Share Resource Center through Programming Environment and Training (PET). Supported by Contract No.: DAHC 94-96-C-0002 with Nichols Research Corp.

DARPA Collaborative Interactive and Visualization. Supported by Contract No. C-5-2293.

A portion of the disclosure of this patent document contains material that is subject to copyright protection. The copyright owner has no objection to the facsimile reproduction by any one of the patent disclosure, as it appears in the Patent and Trademark Office patent files or records, but otherwise reserves all copyright rights whatoever.

BACKGROUND OF THE INVENTION

1. Field of the Invention

This invention relates to collaborative computing and, more particularly, to a platform-independent backbone and framework that may be used to form Web-based virtual communities having virtual rooms with collaborative sessions.

2. Discussion of Related Art

There has been increasing interest in collaborative systems. These systems allow multiple users to interact with one another. Common examples include chat rooms, shared white boards, and the like.

Although there are a few commercial products on the market, some of the more interesting systems are being developed and evaluated in university laboratories. For example, Old Dominion University has developed The Java Collaborator Tool-set. Under this system all events of one application are distributed to all other applications in the session. However, there is no support for multiple sessions of a given application type, and the session management is fixed. The Habanero system of The National Center for Supercomputer Applications at The University of Illinois at Urbana-Champaign uses a client-server architecture in which the client applications provide a user-interface and the application logic is implemented as Java applications, not applets. Consequently, the software is not downloadable and the system is not properly considered as "Web-based." The system is decoupled from browsers and the Web. Moreover, the system does not support selective opening of remote applications.

Though the above systems promise various forms of collaborative functionality, none are known to integrate the advantages of the Internet's informational content or its platform-independence. Moreover, many of the above systems place constraints on the design and construction of the underlying collaborative application. For example, many of the systems require the collaborative application to be built using a set of predefined libraries. Thus, their utility is primarily directed to the development of new applications, meaning that existing applications would have to be entirely re-designed to make them collaborative. Furthermore, the known systems tend to have essentially rigid paradigms of what a collaborative application entails. This is reflected in the design of the prior art systems, which tend to require identical application instances and data models. It is also reflected in the systems having rigid ideas about session management and floor control. (These aspects control how a user may join and leave a collaborative session.)

There is therefore a need in the art for a collaborative system that overcomes the above disadvantages.

SUMMARY

It is an object of the invention to provide a collaborative system that integrates Web-based technologies to provide platform-independence of the collaborative application and to provide a powerful vehicle for distributing collaborative applications. It is another object of the invention to provide a flexible design for the development of new collaborative applications and for the porting of old applications into collaborative versions thereof. It is yet another object of the invention to provide a thin design allowing maximum flexibility of implementation at a logic level, so as to allow dissimilar application instances to collaborate and allowing maximum flexibility of floor control and session management.

Demon logic is embedded in a room page as downloadable platform-independent instructions. The demon logic includes logic to identify, download, and launch control logic associated with the room page. This logic also establishes a communication path between a downloaded demon and downloaded control logic. The demon also includes logic to identify and launch an application associated with the room page. For example, this may include pre-specified start-up applications. This logic establishes a communication path between a downloaded demon and a launched application. The demon further includes logic to identify a server associated with the first room and to establish a communication connection between a downloaded demon and the server. It also includes logic to receive messages from a launched application and downloaded control logic and to forward the messages to the server. It also includes logic to receive messages from the server and to cause at least a portion of the message to be routed to a relevant entity as determined by information in the message, the relevant entity being from a set including the downloaded control logic and the launched application.

The server includes logic to establish communication connections with demons and logic to maintain system state, including a list of associations identifying demons in a room. It also includes logic to receive a message from a demon, to consult the system state, and, in response to the consultation, to forward a message to other relevant demons as determined by the system state.

In this fashion a plurality of clients may access the room page to cause the demon logic to download at respective clients. The downloaded applications may then form a first collaborative session of interacting instances of the application.

DETAILED DESCRIPTION

Figure 1:
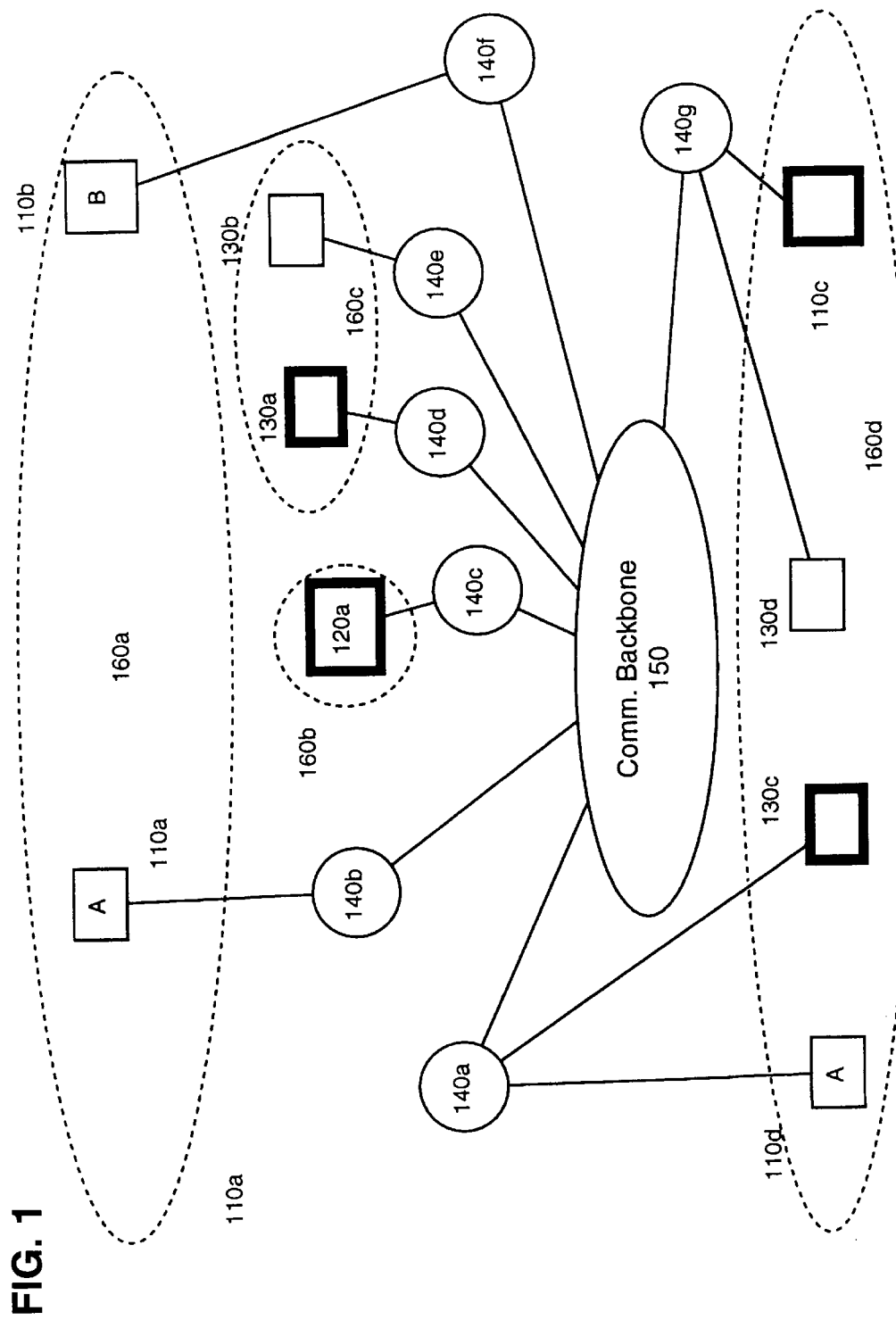
FIG. 1 shows a system state of an exemplary embodiment.

An exemplary embodiment of the invention provides a collaborative backbone and framework that may be used to construct Web-based collaborative systems organized into rooms and communities. Each room may contain a set of collaborative sessions. A given session may involve several compatible applications (i.e., a group) interacting with one another and need not involve identical application instances. The collaborative applications used to form a session may be implemented as downloadable applets, JavaScript applications, or ported versions of existing non-collaborative applications. A community is a group of rooms within which a user may change rooms freely and thus interact with new users in new sessions.

Among their many advantages, the backbone and framework support powerful session management. For example, one privileged user may start and terminate applications at other nodes. This ability greatly improves the initiation and control of certain types of collaborative applications. Moreover, session management and floor control are flexible, in that an implementation may provide its own user interface to provide a room-specific look-and-feel. Moreover, the logic for implementing session management and floor control is likewise downloadable.

The backbone and framework use a Web-based paradigm and use Web-based technologies. The exemplary Web-based embodiments provide (a) easy distribution of the collaborative applications, for example, by supporting downloadable applet implementations of application logic, (b) redundancy of distribution of application logic by allowing architectures having multiple HTTP servers, (c) easy access and use of the wealth of information on the Internet to be integrated into the application logic, (d) scalability by allowing a system to have multiple servers, and (e) platform-independent collaboration through Web-based technologies. The applets used in a given implementation may come from different name spaces; i.e., there is no requirement that all applets or even different instances of the same applet come from the same HTTP server. Moreover, the system provides mechanisms allowing JavaScript applications to become collaborative.

1. Vocabulary

In describing the exemplary embodiments, their use, and related concepts, the following terms are employed. The explanations below are intended to be illustrative, not limiting.

Application: Software logic performing some task, e.g., flight simulation, which, when using mechanisms provided by an exemplary embodiment of the invention, may be made into collaborative sessions.

Application Type: Characterizes an "application" as a defined pair: "application group" and "application subtype."

Application Group: Compatible applications in that they communicate using the same application-specific messages or events.

Application Subtype: Characterizes applications within a group. Two applications having the same application group and application subtype are identical instances. Application group and application type are unique to a room.

Community: A set of rooms that, among other things, are assured of having common user authentication procedures. One community may be serviced by multiple servers.

Room: A room is a logical construct for gathering users and organizing sessions. A user can see other users in the same room. There may be multiple "sessions" in a room.

Session: A logical grouping of applications working in a collaborative way.

2. Basic Model of Operation to Explain Concepts

FIG. 1 shows an exemplary system state at a high-level of abstraction. In this example, multiple, concurrent, collaborative sessions are executing in several rooms. A session is the basic unit of collaboration and involves at least one application instance, though it will typically involve at least two instances. Each instance may operate on its own computer node on a network. The sessions are grouped into rooms. Rooms will typically contain applications and sessions that are related. A room may contain predefined applications that are "allowable" and that are started automatically when initializing a room. Other applications may be dynamically added to a room. A room provides room-specific "look-and-feel" for session management, floor control, and the like. The look-and-feel specifies how one user may determine whether other users are in the room, whether the users are participating in sessions, and the like. Rooms may be organized into communities, which provide another level of commonality, such as common user-authentication. A user may change rooms freely within a community.

Applications 110a–110d are of a given application "group," which is different from application group 120a and application group 130a–130d. Applications in a group are compatible, in that each is designed to send, receive, and/or respond to a given set of application-specific messages. (Application-specific refers to the application group.) For example, application 110a may be a flight simulator belonging to group 110 and application subtype A, and application 110*b* may be a mission control center belonging to application group 110 but with a subtype B. The logic of application 110*a* will be dissimilar than that of application 110*b* (thus, the different sub-types), but each is designed to understand the same application-specific messages. In this example, the application-specific messages might describe the flight pattern of the aircraft and the instructions from mission control.

Applications of the same group may be organized into collaborative sessions. In the example of FIG. 1, applications 110*a* and 110*b* form a first session. A session may consist of a single application instance, e.g., group 120*a*, which for example may represent an initial state of a session, or it may involve many application instances, depending entirely on the nature of the implementation. For example, a chess game might involve two participants per session, but a distance learning application might involve hundreds of participants per session.

Sessions may have "privileged" users. For example, the applications may be implemented so that one user maintains control over whether another user may join the session and become a session participant. Likewise, the applications may be constructed so that the privileged user has the power to start and terminate applications at other computer nodes for other users. This may be extremely powerful in initiating, terminating, and controlling the flow of large or complicated collaborative session. For example, one user may be a teacher in a distance-learning session and may start and terminate educational simulations at student nodes. Privileged users are represented in FIG. 1 with the thick-lined boxes for the applications, e.g., 110*c*.

In this example, there are four rooms 160*a*, 160*b*, 160*c* and 160*d*. In a given room, e.g., 160*d*, a given user 140*a* may determine the existence of the other users in that room, sessions in the room, and the relationship between users and sessions. This "determination" will be governed by the room's look-and-feel of its user interface. A user in a room need not be involved in a session and instead may be merely present, for example, while waiting for another member to enter the room so that they may collaborate. As an example of room-specific look and feel, applications 110*a* and application 110*d* belong to the same application group 110 and have the same subtype A, but user 140*b* may see an entirely different screen display than user 140*a*. Room 160*a* might simply display a textual list of users in a room, whereas room 160*d* may instead use sophisticated graphical icons for each user.

In this example, rooms 160*a–c* each have a single session in the room. Room 160*d*, however, has multiple, concurrent sessions: one session being 110*c* and 110*d*, and another being 130*c* and 130*d*. Applications of a given group in a room do not define a session. For example, two new users might enter room 160*d* and create their own collaborative session, with applications of group 110, e.g., 110*e* and 110*f* (not shown). This might be the case if the room 160*d* corresponds to a chess tournament with users 140*a* and 140*g* playing one game, and the new users playing another.

A user may switch from one room, e.g., room 160*c*, to another room 160*a*, but he or she (logical user) cannot exist in two rooms simultaneously. Thus, user 140*a* may decide to change rooms from 160*d* to 160*a*. Analogously to sessions, rooms may have "privileged" users who control entry and possibly exit from a room.

A community may be formed from at least one room. A community defines certain commonality, for example, common authorization procedures, and might also specify a community-wide look-and-feel of the user interfaces. For example, rooms 160*a* and 160*c* may be grouped into a community.

The applications collaborate by sending messages over the communication backbone 150. Some of these messages are control messages which are interpreted by the backbone 150 and may cause the backbone to perform certain functions. Other messages are application-specific events. These application-specific events are not interpreted by the backbone (other than to the limited extent necessary for the server to determine which applications should receive the event) and instead carry meaning only to the application logic.

3. High-Level Architecture of System

Figure 2:
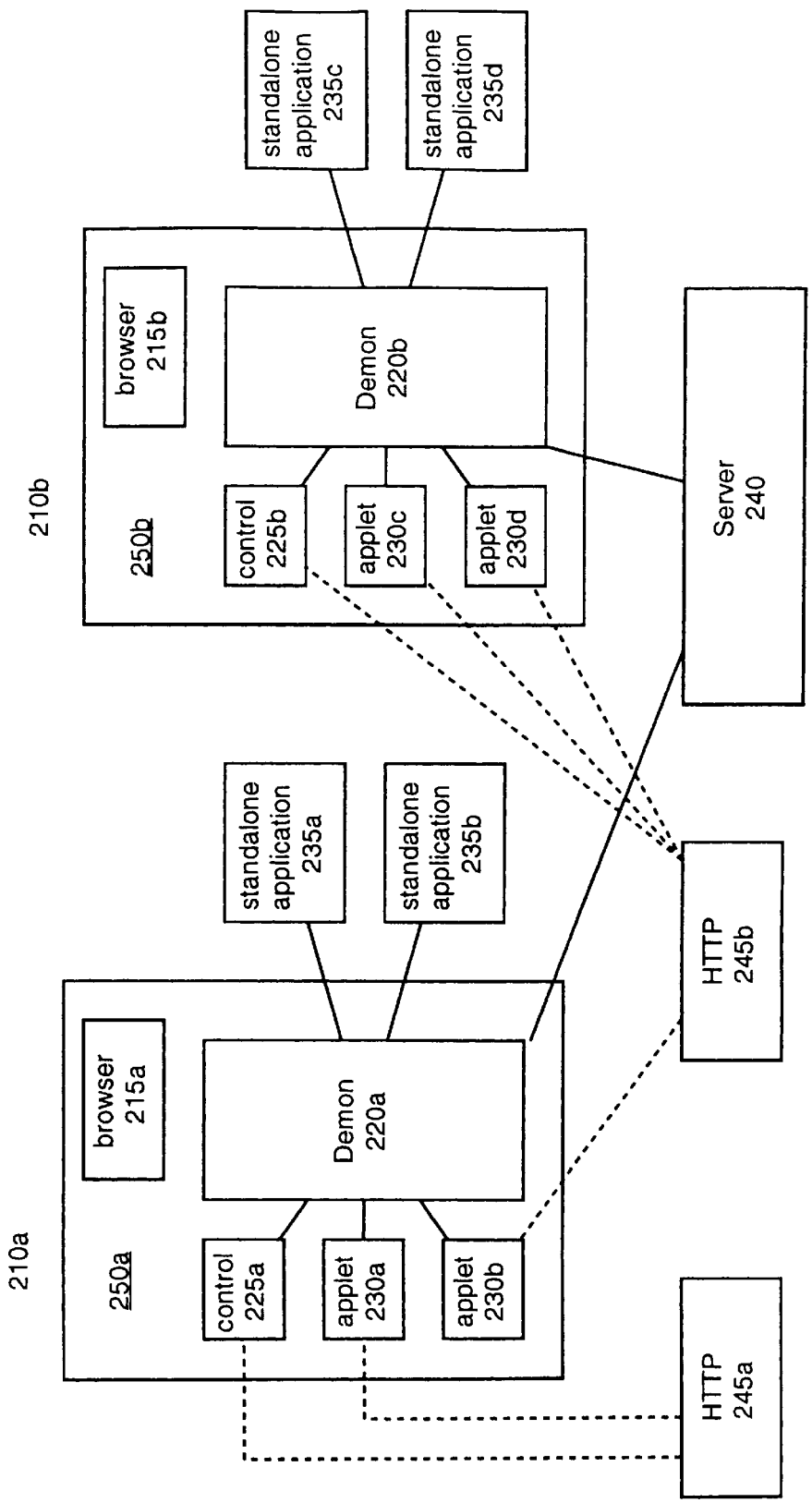
FIG. 2 is a system architectural diagram of an exemplary embodiment.

FIG. 2 shows a high-level architectural diagram of an exemplary system, having clients 210*a* and client 210*b*, server 240, and HTTP servers 245*a* and 245*b*. The actual number of clients, servers, and HTTP servers is implementation-specific. (The suffixes, e.g., 'a', are used to uniquely identify instances and the prefixes are used to identify the type of an instance. Thus "210*a*" indicates client by using prefix "210" and a particular client by using suffix 'a.')

An exemplary client 210*a* has an operating environment 250*a* containing applets 230*a–b*, browser logic 215, and control logic 225*a*, all in communication with a demon 220*a*. The demon, in turn, is in communication with stand-alone application(s) 235*a–b* executing outside of environment 250*a*. Every client 210 is expected to have a demon 220. However, the combination of control logic 225, applets 230, browser logic 215, and stand-alone application(s) 235 is implementation-specific, as is the actual logic of these entities. ("Application," unless prefixed by "stand-alone," refers to a stand-alone applet, embedded applet, JavaScript applications, or stand-alone application. A stand-alone applet executes in a stand-alone frame derived from pre-defined Java class "java.awt.Frame". An embedded applet executes within a HTML page, meaning that the applet executes in a frame provided by the browser. The use of embedded applets allows the possibility of having several totally independent applets executing in independent sessions inside a single window.)

The browser logic 215 provides the environment 250, starts the demon 220, and provides a communication infrastructure for the entities within the environment 250. An exemplary implementation uses the known Netscape Navigator browsing logic 215 and environment 250 with Live-Connect technology to allow communication among entities in environment 250.

A demon 220*a* is a communication nexus at the client-side. It is responsible for sending and receiving various messages from the applications 230*a–b*, 235*a–b* and control logic 225 and sending them to the server 240. It is also responsible for receiving messages from the server 240 and routing them to the relevant entities. The demon maintains local copies of system state, some of which is modified during the processing of certain messages.

An exemplary embodiment constructs the demon 220 as an applet embedded in a HTML page for the room. Upon accessing the relevant page, the demon initializes (more below). Among its various responsibilities, the demon 210*a* causes the loading and starting of the applications and control logic, optionally in cooperation with the HTTP servers. (Other embodiments, such as for Explorer browsers, available from Microsoft, may use known alternative logic to implement demons, applications, environments, and the like, or they may use alternative techniques for the Navigator environment, such as by using plug-ins.)

The applets 230*a–b* and the stand-alone applications 235*a–b* are the actual entities that will collaborate with other applications 230*c–d* and 235*c–d* executing on another client 210*b*. The actual logic of these entities is implementation-specific. In the above example, these would be the entities having the logic for the chess games, flight simulations, or the like. These applications use certain messages in the system-supported protocol to inform other collaborating entities of events and to share critical resources in a coherent manner.

The control logic 225 is responsible for session management and floor control. Any implementation of control logic will likely want to include mechanisms allowing for the following session management and floor control functions, all of which are supported by the system logic and protocol:

1. entering and exiting rooms (e.g., changing rooms);
2. joining an existing session in a room;
3. launching a local or remote application;
4. terminating a local or remote application;
5. controlling entry and exit to rooms with permissions; and
6. controlling the joining and terminating of a session with permissions.

The control logic 225 is also responsible for providing an interface to the user to display relevant information and to allow the user's initiation of collaborative actions. This user-interface is room-specific. For example, the control logic 225 might display textual or iconic representations of the sessions in a room, in conjunction with each session's participants, and the users in a room. An exemplary embodiment of the system provides a default set of control logic, but it is expected that developers will desire to construct implementation-specific control logic, exploiting the functionality provided by the system.

An exemplary embodiment of the invention implements the control logic 225 as a downloadable applet, associated with a room page. This applet (or applets) is started by the demon 220, during startup. Moreover, the startup procedure will also specify room-specific information that may be used by the control logic 225 to establish the room-specific user interface.

The demon 220 communicates with the applications 230*a–b* and 235*a–b* and control logic 225 through defined interfaces. More particularly, the demon 220 provides a method-based API for entities within the environment 250*a* (e.g., applications 230*a–b*, control logic 225*a*), and a socket-based API for entities that execute externally to environment 250*a* (e.g., stand-alone applications 235*a–b*). The application interfaces effectively mirror the protocol messages described in a later section. It is through this interface that the applications 230*a–b* and 235*a–b* can cause the demon 220*a* to send to the server 240 application-specific events and shared variable messages to share critical data in a coherent manner. It is also through this interface that the control logic 225*a* can cause the demon 220*a* to send messages to implement the session management and floor control functions. Likewise, the demon 220*a* uses this interface to route any messages it receives to the relevant entities.

The applications 230*a–b* and 235*a–b* and control logic 225*a* register their respective communication interests with the demon 220*a*. An exemplary embodiment, for example, uses "control-types" to enumerate sets of messages, or correspondingly to enumerate interest in respective sets of messages, as follows:

1. Receive all control messages;
2. Receive no control messages;
3. Receive information about users in a session;
4. Receive information about all sessions in this room;
5. Receive information about all changes in this room, e.g., users entering and exiting;
6. Receive information about locks with scope larger than session;
7. Receive information about controlling a session (i.e., "Active Session" registration);
8. Receive information about controlling room activities (i.e., "Active Room" registration);
9. Receive information about controlling locks.

(Another control-type called "Restartable" is used during startup and when changing rooms and will be described in a later section.) The demon 220 analyzes received messages and forwards them to the relevant registered entities depending upon their registered interest and the type of message received; application-specific events are distributed based on particular identifying information in the message, called session identifiers (more below).

The server 240 is another communication nexus but at a system-level. It is responsible for communicating with all demons 220*a–b*, for all rooms serviced by the server 240, and for maintaining data structures reflecting the state of the system.

The server 240 receives messages from the demons 220 and transmits messages to them. Some of the messages involve relatively simple responses by the server 240. For example, an application-specific event, when received and processed by the server, will cause the server to send that event to all demons having an application belonging to that session. Other messages involve more sophisticated behavior. For example, some collaborative control actions may involve a series of negotiations that need to be performed among many demons. For example, changing a room may require permission to enter the room and to join automatically-started predefined applications in that room.

An exemplary embodiment implements the server logic 240 above a TCP/IP protocol layer (not shown). The server logic communicates with the TCP/IP software to cause the TCP/IP software to transmit a message as a TCP/IP packet on a network.

The server 240 maintains data structures reflecting the state of the system. The system state includes the rooms serviced by the server 240, the users in each room, the sessions in each room, and the participants of each session. This state is gathered and maintained during the processing of certain messages. The server consults the state to perform the necessary actions in response to a message. For example, when processing an application-specific event, the server 240 needs to consult the state to determine which demons should receive the event.

The server 240 also maintains locks and shared variables used by the system and the applications. Locks and shared variables are used to keep the associated information "coherent." Some of the locks and variables are created automatically by and used by the system. For example, when an a user causes the creation of a session, the system automatically creates join and terminate locks, which are used to control joining and terminating a session; likewise enter locks are created automatically for rooms. Other locks and variables may be created and used by the applications; the creation and use of these locks is implementation-specific, but it is expected to follow the protocol of the system. The information for these lock and variables is gathered and maintained during the processing of certain messages. The server consults the state to perform the necessary actions in response to a message. For example, when a message is received to terminate an application at a remote demon, the server checks that the requesting demon holds the terminate lock for that session.

The HTTP servers 245*a–b* are in communication with the clients 210*a–b*. The servers are responsible for providing applets and some defined data for those applets. The applets used in a given implementation may come from different name spaces; i.e., there is no requirement that all applets or even different instances of the same applet come from the same HTTP server. In the example of FIG. 2, HTTP server 245*a* supports control and application applets 225*a* and 230*a*, and HTTP server 245*b* supports control and application applets 225*b* and 230*b–d*. This use of multiple HTTP servers offers flexibility not previously attained in the art. For example, demon 210*a* may be executing at a node in Los Angeles, Calif., and demon 210*b* may be executing at a node in Boston, Mass. If a single HTTP server were used near Boston, demon 210*a* would suffer long load times. The multiple HTTP servers may also be arranged in redundant fashion, so that if a demon is unable to load an applet from one server it may obtain it from another. Moreover, in a given session, it is possible that one server 245*a* may have one application type, e.g., 110*a* of subtype A, and another server 245*b* may have another application type in the same group, e.g., 110*b* of subtype B. Though the system's flexible design allows for the separation of HTTP server 245 from server 240, and for the use of multiple HTTP servers 245*a–b*, the system does not force such an arrangement, and all of the above functionality may be incorporated into one node.

4. Messages and Protocol

The exemplary server 240 and demons 220 communicate using a defined protocol. The various collaborative actions, such as entering a room, are implemented by sending an appropriate message sequence. The actual sequence will depend on the state of the system.

The following message groups and corresponding messages are used in the protocol. The specification for these messages is provided in the Appendix, which is to be considered as part of this detailed description.

1. Room Management Messages
   a. Room Enter Request
   b. Room Enter Ask
   c. Room Enter Answer
   d. Room Info Data Request
   e. Room Info Data Response
   f. Room Enter Response
   g. Room Exit Notification
2. Sessions Management Messages
   Start subgroup
   a. Start Request
   b. Join Ask
   c. Join Answer
   d. Start Ask
   e. Start Answer
   f. Start Action
   g. Start Notification
   h. Start Response
   Terminate subgroup
   i. Terminate Request
   j. Terminate Ask
   k. Terminate Answer
   l. Terminate Action
   m. Terminate Notification
   n. Terminate Response
3. Information Messages
   a. Session Created Information
   b. Session Removed Information
   c. User Entered Session
   d. User Left Session
   e. User Entered Room
   f. User Left Room
4. Variable and Lock Messages
   a. Create Variable Request
   b. Create Variable Response
   c. Lock Changed
   d. Get Value
   e. Value Data
   f. Set Variable Request
   g. Set Variable Response
   h. Take Lock Request
   i. Lock Release Request
   j. Lock Release Response
   k. Take Lock Response
   l. Get Lock Info
   m. Lock Info Data
5. Demon Polling Messages
   a. Demon Alive Ask
   b. Demon Alive Answer
6. Event Messages Message groups 1–4 are used to implement session management and floor control. Thus, the control logic 225 in the client 210 will be the primary entity interested in these messages, particularly so for groups 1–3. Alternatively, session-specific application logic may assume responsibility for handling these messages. Message group 5 is used by the system to detect unresponsive demons. Application logic will use message group 6 to distribute events and, like control logic 225, will use message group 4 to share application-specific critical information in a coherent manner.

Much of the protocol follows a general pattern. Specifically, a collaborative action is typically started with a Request message ("xx_REQ message in the Appendix) from a demon 220 to the server 240. Depending on the system state, the server 240 responds in one of several ways. For example, if the action requires the permission of another entity (or entities), the server 240 negotiates for such permission by sending an Ask message ("xx_ASK") to the demon 220 from which permission is required. The demon 220 from which permission is needed will respond to an Ask message with an Answer message ("xx_ANS") to the server 240. A given Request may involve the need for multiple permissions, for example, to enter a room and to start an application. If an action may be started, for example, after permission has been negotiated, the sever 240 attempts to trigger the desired action with an Act message ("xx_ACT") to the relevant demon 220. The demon 220 receiving the Act message responds with a Notification message ("xx_NOT") to the server 240 to indicate whether the action is done. The server 240 will send a Response message ("xx_ACK") to the demon 220 that initially requested the start of the action to indicate whether the requested action was performed, and will send an Informational message ("xx_INF") to all relevant entities indicating the action so that they may update their local copy of state. There are some deviations from the above specified with the protocol. For example, a Demon Alive Ask message is not seeking permission and instead is really requesting a response. Moreover, certain actions will not require all of the messages above, because of the state of the system. For example, in many instances permission is not needed and thus Ask and Answer messages are not needed. Also, in some instances, an acknowledgement is implied, such as when terminating a local application.

Figure 9:
FIG. 9 shows an exemplary message sequence for getting system state according to an exemplary embodiment.
Figure 10:
FIG. 10 shows an exemplary message sequence for detecting responsive demons according to an exemplary embodiment.
Figure 11:
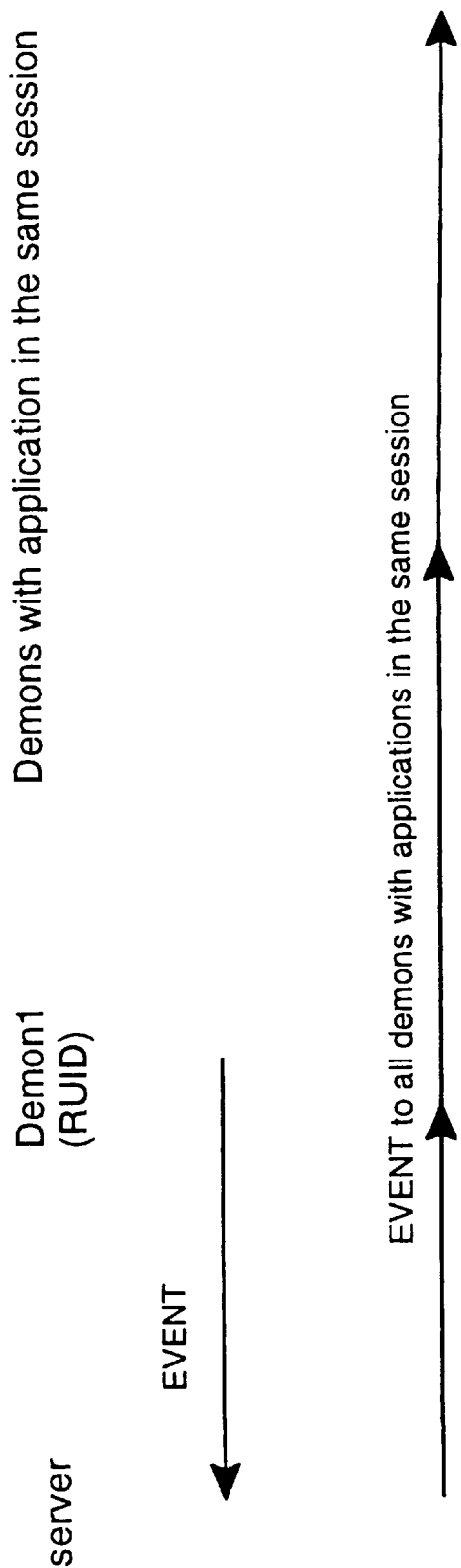
FIG. 11 shows an exemplary message sequence for sending event messages according to an exemplary embodiment.

FIGS. 3–10 illustrate the protocol with respect to control messages, and FIG. 11 illustrates the protocol with respect to application-specific events. The sequences shown are representative and typically illustrate the most complicated scenarios for a given collaborative action. The Appendix provides a formalized description of the protocol, and should be referenced conjointly with the description below. In this regard, the Appendix frequently refers to invoking certain methods on the demon APIs with reference to "applications" and "Active" application or session. The use of the term "application" in the Appendix is generalized to include the control logic 225, because, as stated above, once the control logic, applications, and applets have registered their interest in receiving messages, the demon no longer distinguishes among the entities. The use of the term "Active" application or session refers to the registration interest, as specified by control type, of the applications communicating with the demon that is interested in the control messages for a session. This will typically be the control logic. Analogously. Active room or Active lock registration means the entity is interested in control messages relevant to contolling the room, or to controlling the locks.

Figure 3:
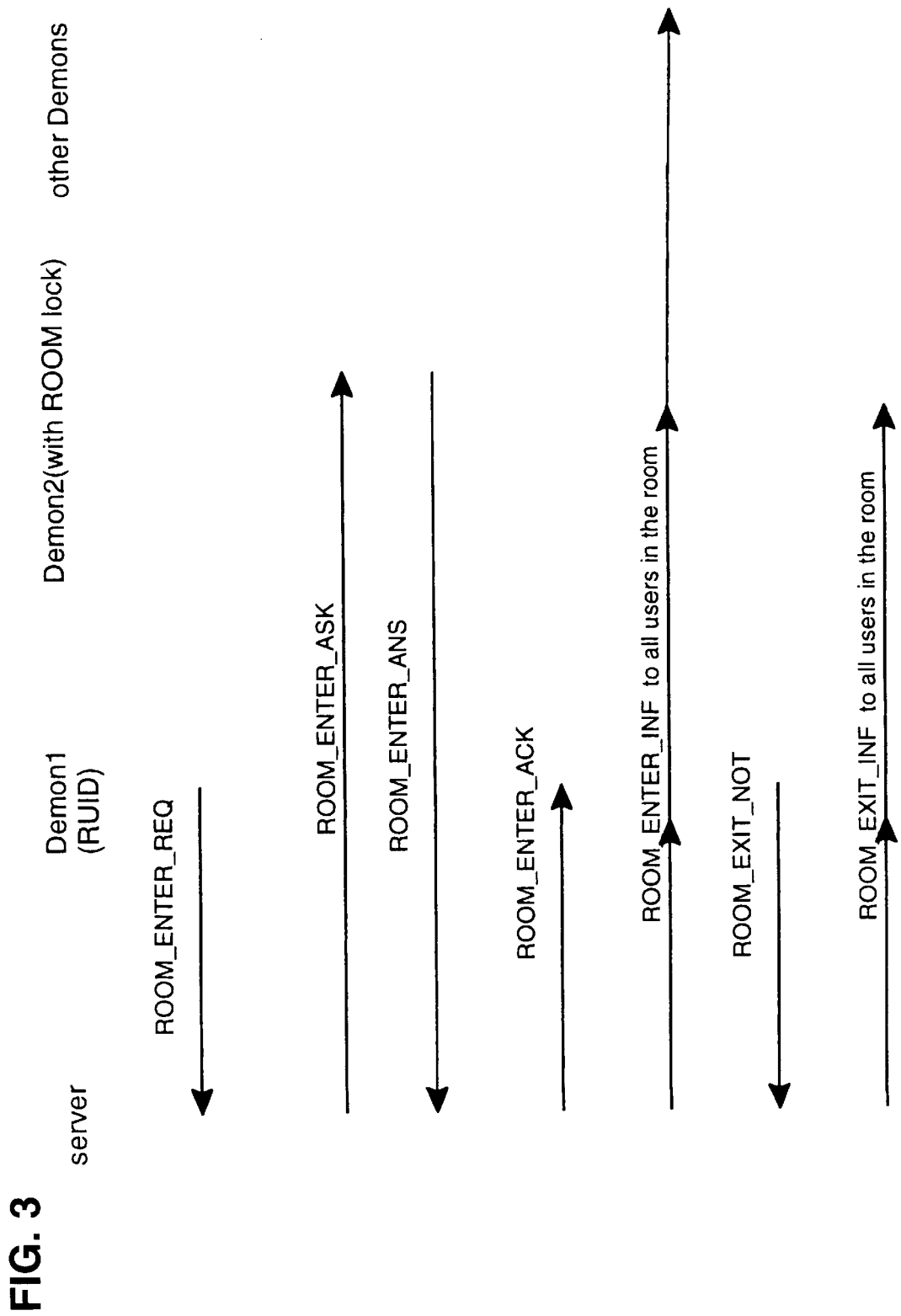
FIG. 3 shows an exemplary message sequence for entering and exiting rooms according to an exemplary embodiment.

FIG. 3 shows exemplary message sequences involved with entering and leaving a room. Demon 1 sends a ROOM_ENTER_REQ message to the server 240. This message may be the result of a user activating an interface control to change a room. In response to the activation, the control logic 225 calls the method on the demon corresponding to changing rooms, and in response the demon may perform some room-specific authentication procedures (for example, procedures associated with the community to which the room belongs) to determine whether the user RUID is allowed to enter the room. If not, the request will go no further. If the user is allowed to enter, the Demon 1, in turn, responds by sending the ROOM_ENTER_REQ message to the server. The server 240 receives the message and eventually processes it. In particular, the server 240 determines whether an entity controls access to the room by checking its lock and shared variable data structures to determine whether one of demons is holding the enter lock for the room in exclusive mode (i.e., X mode). In this case, Demon 2 holds the room lock in X-mode, and thus the permission of Demon 2 is needed. Consequently, the server 240 sends a ROOM_ENTER_ASK message to Demon 2, asking whether Demon 1 is permitted to cause other applications to be launched. Demon 2 will forward the Ask message to the corresponding control logic 225, which will then determine whether the user is permitted to join the room. In this fashion, room entry may be made to be room-specific. Depending on the implementation and the system's state, the control logic associated with Demon 2 will grant or deny permission and cause Demon 2 to respond with a ROOM_ENTER_ANS message to the server 240. The server 240 sends a ROOM_ENTER_ACK message to Demon 1 with the results, and updates its data structures to reflect a new room user if access was permitted. Demon 1 will receive the _ACK and forward it to the control logic 225, which will respond accordingly. As part of its response, Demon 1 will send a ROOM_INF_GET message (see FIG. 9) to the server 240, requesting all relevant room information, and it will set a timer for the response. The server will respond to the _GET message with a ROOM_INF_DAT message (see FIG. 9), providing room-specific information. Demon 1 will use this data to update demon data structures to reflect the room's state. This information may then be accessed by the control logic and used to update the user interface. The server 240 also sends a ROOM_ENTER_INF message to all users in the room. This information message will be received by all demons 220 in that room, each of which will use the information to update its room data structures. Each demon will behave in a room-specific manner. For example, the control logic 225 can update the user interface to display the names or representative icons of the room users. (The room locks are created during the creation of the room, i.e., when the server sets-up the room; the locks initially have their state set to N, meaning neutral.)

Assume that some time later the user desires to leave the room and activates the appropriate room-specific controls, or that the above transaction was part of a room change operation, in which a user enters one room and leaves another. The control logic 225 causes the demon logic 220 of Demon 1 to send a ROOM_EXIT_NOT message to the server 240. (The demon itself may initiate this message as well, for example, as part of an orderly shut-down) The server 240 updates its data structures to reflect the new system state and sends a ROOM_EXIT_INF message to all users in the room so that they may behave accordingly. As will be explained below, as part of processing the room exit request, the server will update its state, including potentially its deleting certain locks owned by the departing user. As will be explained below, the ROOM_ENTER_REQ and ROOM_EXIT_NOT messages will be received by the server and processed by "operation logic." The operation logic essentially implements a state-machine corresponding to the protocol. In the above example, it would include stages for Asking for permission to enter the room, waiting for the Answer, and issuing a Response after an Answer is received.

Figure 4:
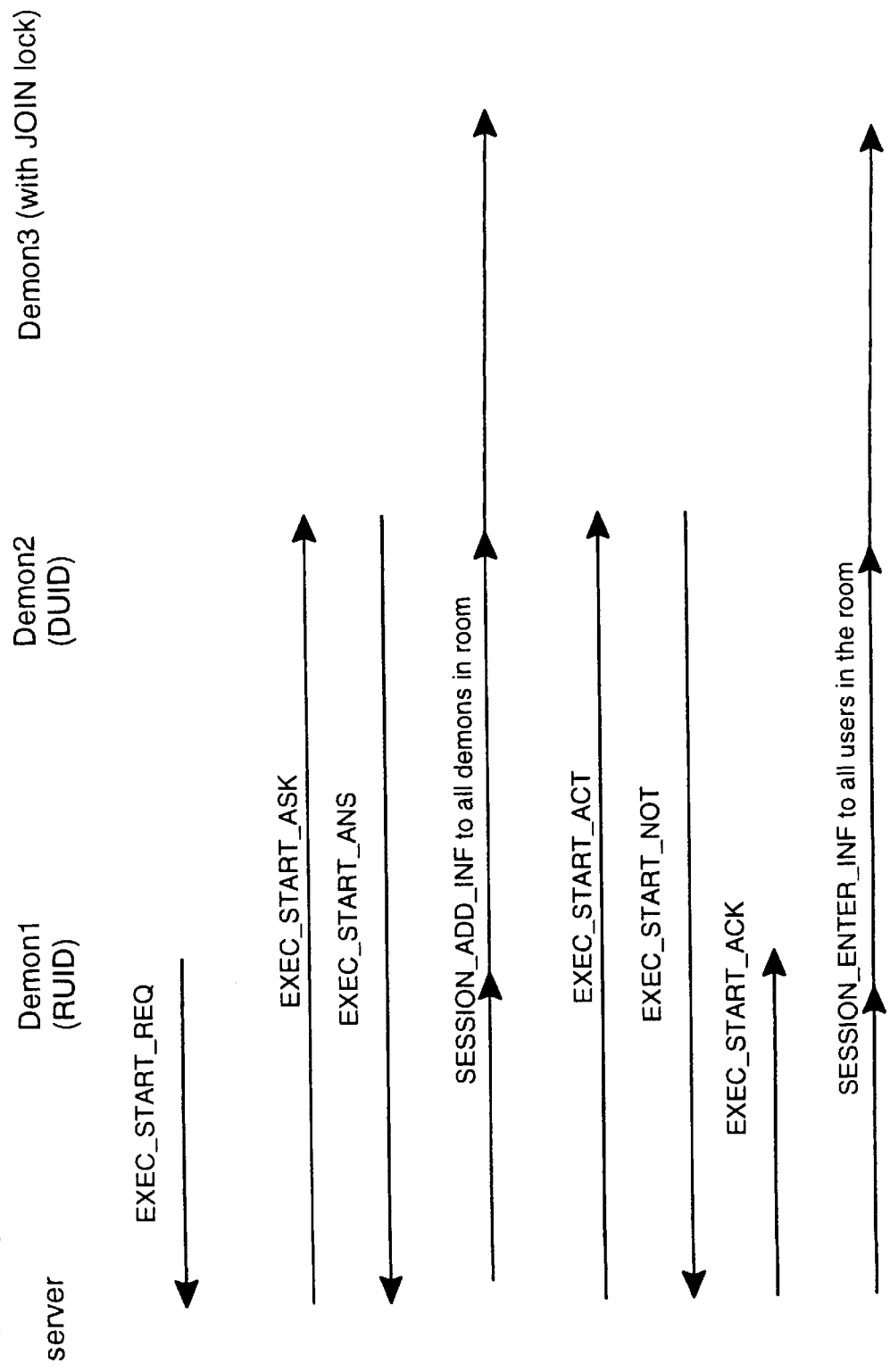
FIG. 4 shows an exemplary message sequence for launching an application according to an exemplary embodiment.

FIG. 4 shows an exemplary message sequence involved with creating a collaborative session. This action might result from a user activating a control representative of a corresponding "allowable" application, or it may be the result of a user entering an otherwise empty room having predefined startup applications. In this example, the requesting user RUID at Demon 1 is requesting that the application execute at Demon 2. This might be the case if user RUID is executing an application that involves remote simulations. This flexibility alleviates the remote users at the destination demons from needing to know how to find and start the collaborating application, i.e., the simulations. The EXEC_START_REQ message to the server indicates that RUID desires an application to start at Demon 2 having an identification DUID. The server determines that the session does not yet exist, or more specifically that the session has no join lock associated with it. (The server and demon may have already negotiated with one another to assign an identification to the session.) The server 240 responds by sending an EXEC_START_ASK message to the destination demon, Demon 2. The demon will then forward the message to the entity registered as an Active Session, which will typically be the control logic. The entity will eventually respond to the Ask, and the Demon 2 eventually responds with its answer in an EXEC_START_ANS message to the server 240. The server 240 sends a SESSION_ADD_INF message to all users in the room, so that they may know about the existence of a new collaborative session in the room. Assuming that the answer from Demon 2 is affirmative, the server 240 attempts to trigger the start of the application on Demon 2 with an EXEC_START_ACT message. Demon 2 will then start, or launch, the application instance. This application may be a local application to be run externally, a downloaded applet(s), or a JavaScript application in a HTML page. It may run externally or execute within environment 250. Demon 2 eventually responds with an EXEC_START_NOT message to notify the server 240 whether the application started. Assuming the notification is positive, the server 240 sends an EXEC_START_ACK message to the original requesting demon user RUID to acknowledge that the application started at Demon 2. If Demon 1 wanted to start an application locally at Demon 1 then no EXEC_START_ASK message is sent or needed. Instead permission to start an application locally is implied by the Request message. (The session locks are created when assigning the SID; the locks initially have their state set to N, meaning neutral.)

Figure 5:
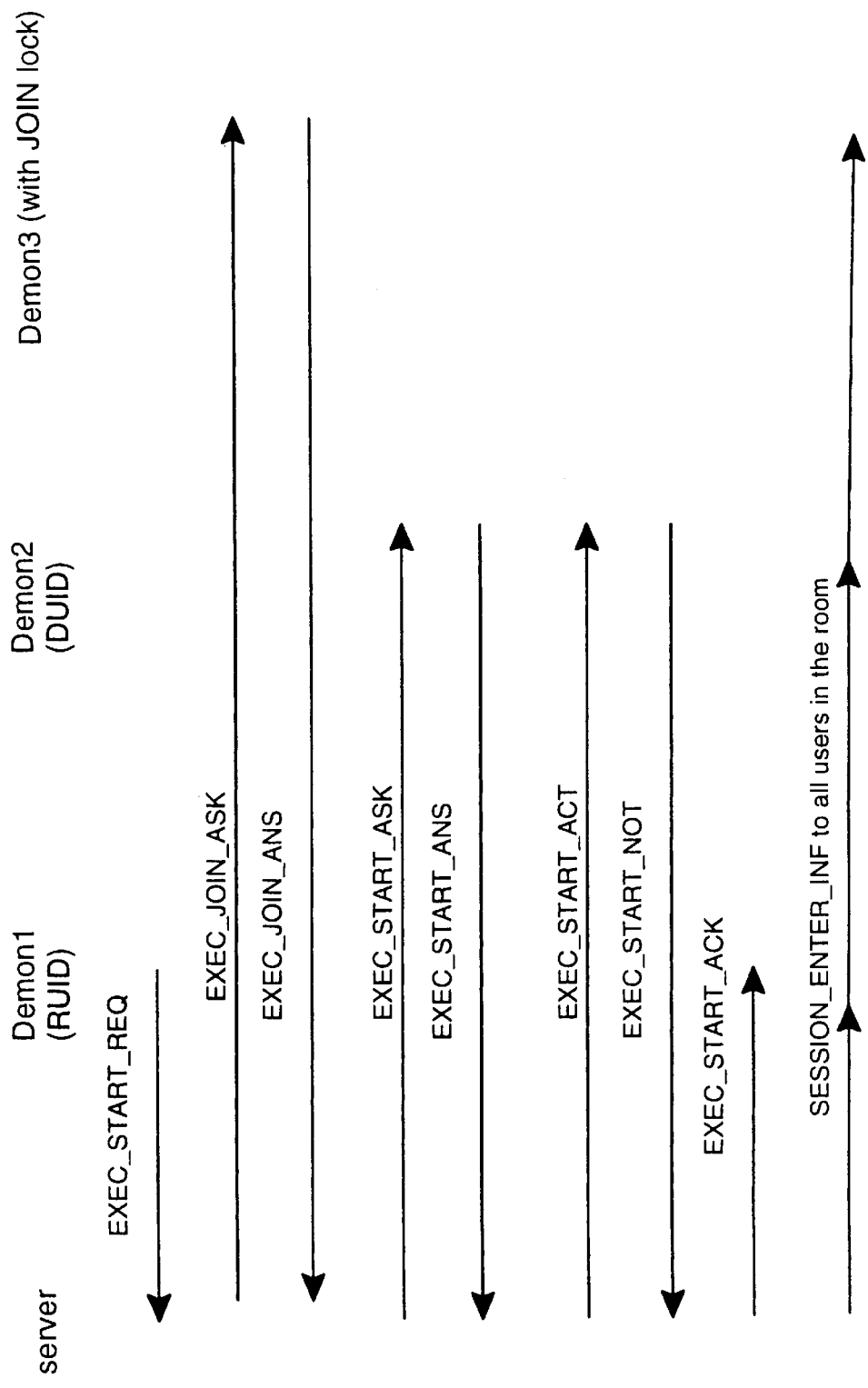
FIG. 5 shows another exemplary message sequence for joining a session according to an exemplary embodiment.

FIG. 5 shows an exemplary message sequence involved with joining a collaborative session that already exists. The existence of the session, for example, may be reflected on the user interface by the room-specific control logic 225. A requesting Demon 1 (RUID) sends an EXEC_START_REQ message to the server 240, requesting that an application be started on Demon 2. The server 240 checks its data structures and determines that Demon 3 holds a join lock for the session in exclusive mode. Consequently, the server 240 sends a EXEC_JOIN_ASK message to Demon 3 to determine if demon 1 may join session. The Ask message is forwarded to the first entity that registers with the demon as an Active Session, i.e., typically the control logic 225 of Demon 3. Demon 3 eventually responds with an EXEC_JOIN_ANS message to the server, containing the answer. Assuming that the answer is affirmative, the system responds as it did in the case of FIG. 4, which illustrated the sequence for starting an application at another node. Like the above example of room entry and exit, the EXEC_START_REQ message will be received by the server and processed by "operation logic." The operation logic essentially implements a state-machine corresponding to the above protocol of FIGS. 4 and 5, as well as for the simpler cases, such as local launching. Any new user to a session will use application-specific mechanisms to synchronize to current users. For example, an application may decide to maintain critical application state as a shared variable maintained by the system.

Figure 6:
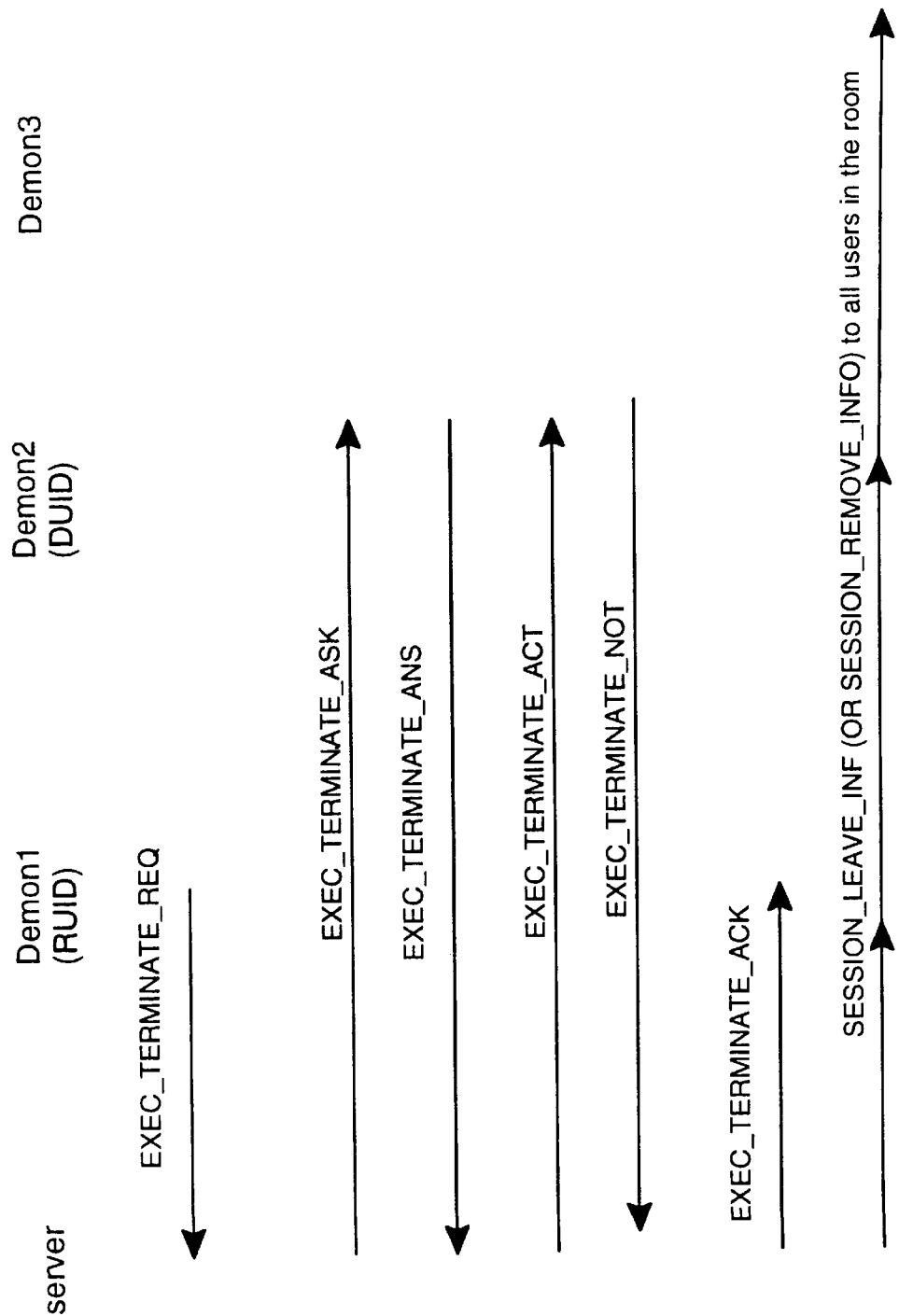
FIG. 6 shows an exemplary message sequence for terminating an application according to an exemplary embodiment.

FIG. 6 shows an exemplary message sequence involved with terminating an application at a remote demon. This may be the result of a user activating interface controls to quit a collaborative session, or it may be part of an orderly shut down by a demon. Demon 1 sends an EXEC_TERMINATE_REQ message to the server 240 requesting termination of an application executing on Demon 2. The server 240 checks the state of the terminate lock for this session. Only a user holding a terminate lock for the session or a local user may request termination of an application at its demon. If the destination user (DUID) has the lock in shared mode, the application should not be terminated without Demon 2's permission. If DUID does not hold the lock, then the application may be terminated without its permission. In this example, Demon 2 holds the terminate lock in shared mode. Consequently, the server 240 sends an EXEC_TERMINATE_ASK message to Demon 2. Similarly to the above, the demon will forward the message to the first entity that registered as an Active session, which is expected to typically be the control logic. This entity is then expected to provide an answer to the demon. Demon 2 responds with an EXEC_TERMINATE_ANS message to the server 240. The server 240 then sends an EXEC_TERMINATE_ACT message to Demon 2 to trigger the termination, and Demon 2 responds with an EXEC_TERMINATE_NOT message to the server. The server 240 updates its data structures accordingly and sends an EXEC_TERMINATE_ACK message to Demon 1 acknowledging the termination, and a SESSION_LEAVE_INF message to all users in the room so that they may update their data structures and user interfaces accordingly. Like the above examples, the EXEC_TERMINATE_REQ message will be received by the server and processed by "operation logic." The operation logic essentially implements a state-machine corresponding to the above protocol and to the simpler variants, such as when no terminate lock is held or when the termination is for a local application.

Figure 7:
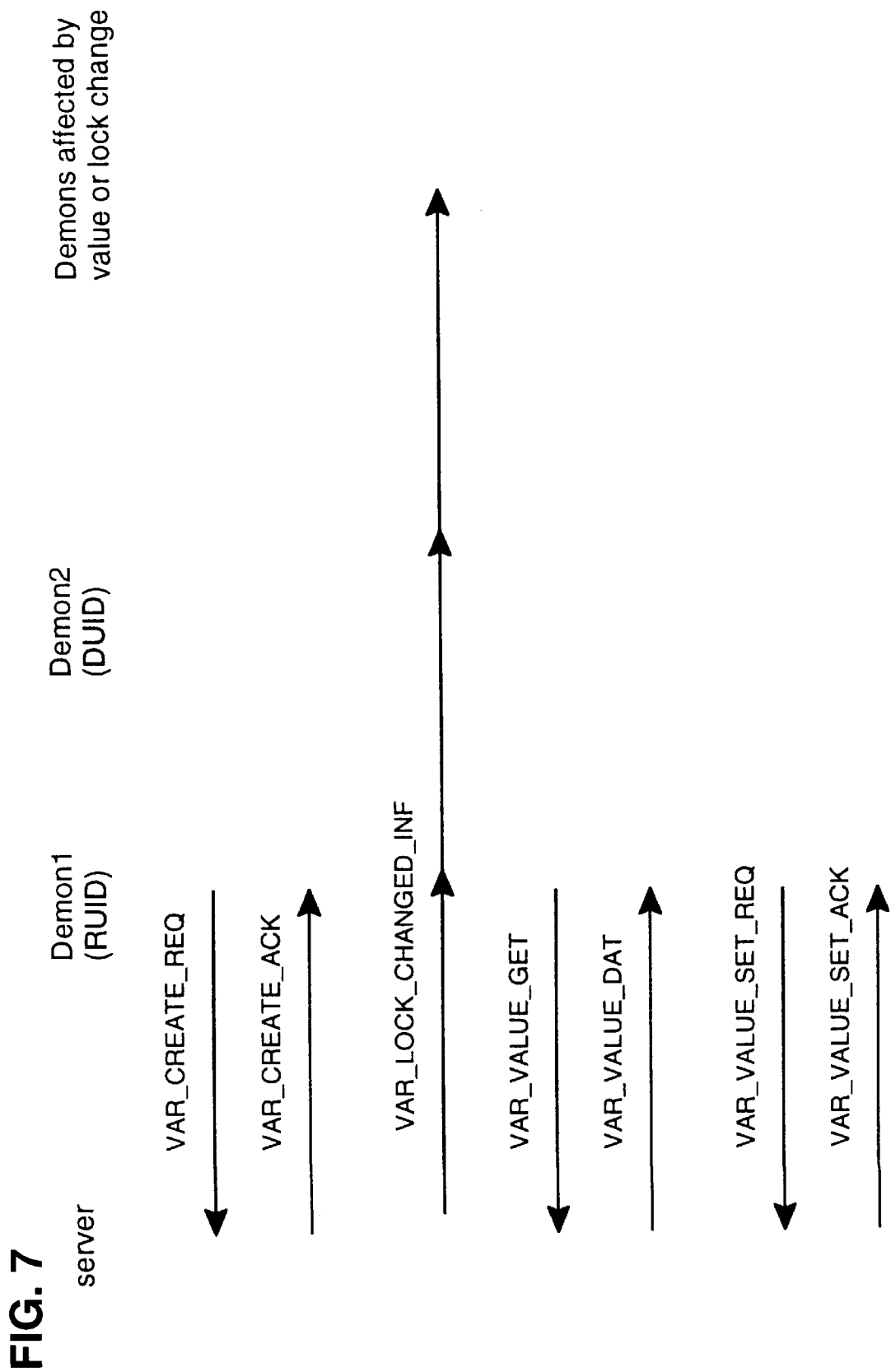
FIG. 7 shows an exemplary message sequence for creating and using shared variables according to an exemplary embodiment.

FIG. 7 shows exemplary message sequences involved with creating and using shared variables. These shared variables could be created and used by the applications themselves to ensure coherency. (Certain locks and shared variables are automatically created by the system, e.g., join, terminate, and enter locks.) Demon 1 sends a VAR_CREATE_REQ message to the server 240 to request the creation of a shared variable. The server checks to see if the variable already exists, and if not creates one at the specified scope, with the specified initial lock mode, and with the specified life span (more below). The server 240 responds with a VAR_CREATE_ACK message to acknowledge whether that variable was created. The server also sends a LOCK_CHANGED message to all relevant entities. If the lock was at a room or server scope, LOCK_CHANGED is sent to all demons; if at a session scope, then LOCK_CHANGED is sent to all demons relevant to that session.

To read the contents of a shared variable, Demon 1 sends a VAR_VALUE_GET message to the server. The server determines whether the variable is in a proper read state (i.e., the requester holds the lock in S mode or X mode). If so, the server responds with a VAR_VALUE_DAT message that contains the variable's contents. If not, the server responds with a VAR_VALUE_DAT message that contains a status indicating that the requester does not hold the lock. In this case, the requester may then attempt to negotiate for the release of the lock to become a holder of the variable.

To write to a shared variable, Demon 1 sends a VAR_VALUE_SET_REQ message to the server. The server checks whether the requesting demon holds the lock in X mode. If so, it allows the update and responds with a VAR_VALUE_SET_ACK message, acknowledging that the value has been modified. If not, is sends a VAR_VALUE_SET_ACK message having a status indicating why the update did not occur, e.g., requesting demon does not own lock in X mode.

Figure 8:
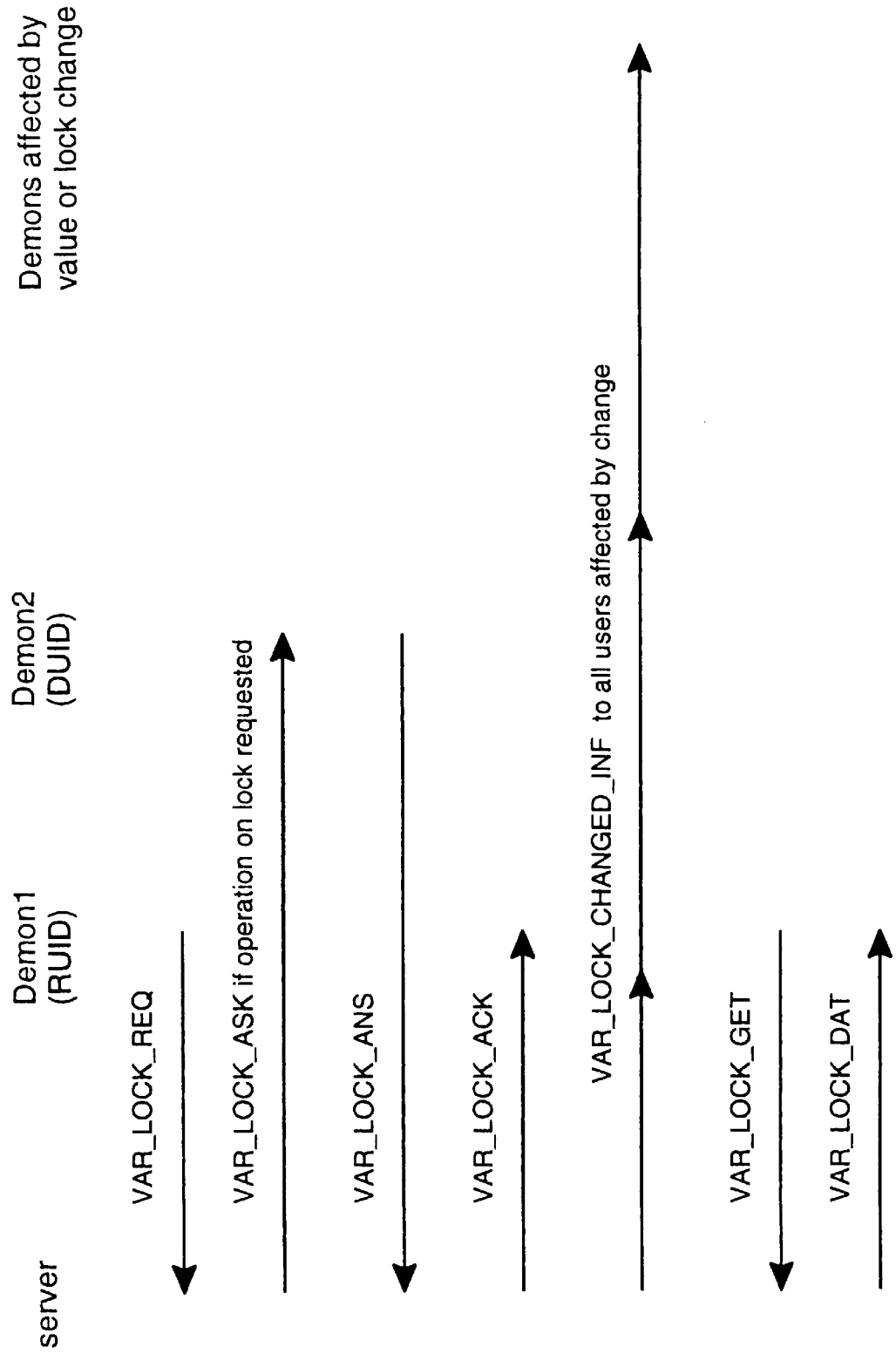
FIG. 8 shows an exemplary message sequence for creating and using locks according to an exemplary embodiment.

FIG. 8 shows exemplary message sequences involved with using locks to maintain coherency of data. The locks involved may be simple, i.e., essentially flags with a specified holder, or they may be locks associated with shared variables, described above. To request a lock, Demon 1 sends a VAR_LOCK_REQ message to the server. This might be needed, for example, if Demon 1 needs the lock in X mode so that it so that it might update an associated value, in the case of a shared variable. The request might also specify that another user or demon should hold the lock. If no entity holds the locks and it exists, the server permits the user to hold the variable in the requested mode. In this example, however, the lock is owned by Demon 2 (either in S or X mode). Thus, the server needs to negotiate for permission and sends a VAR_LOCK_ASK message to Demon 2, requesting it to release the lock. Demon 2 forwards the message to the relevant entity, which causes Demon 2 to reply with a VAR_LOCK_ANS message, indicating whether it agreed to release its ownership. The server 240 receives the Answer and sends a VAR_LOCK_ACK message to Demon 1, indicating whether the lock was granted in the requested state or whether the request for the lock was unsuccessful, for example, because the lock holder refused to release the lock. The server 240 then sends a VAR_LOCK_CHANGED_INF message to all users affected by the change in the lock status.

To obtain information about a lock, Demon 1 sends a VAR_LOCK_GET message to the server, which replies with a VAR_LOCK_DAT message containing the data, e.g., lock state and holders.

The above protocol regarding locks and shared variables is used by the system and applications using the system to maintain shared data coherency. Under this approach, an entity may only write to a lock or shared variable if it holds the lock or shared variable in X mode. To read a lock or shared variable, the entity must hold the lock or shared variable in S or X mode. If the entity does not hold the lock or shared variable in the proper mode to perform a desired task, it must ask the other entities (in the case of S mode) to release the lock so that it may attain the desired state. The actual logic for responding to such requests is implementation specific; for example, an implementation will have its own rules for determining whether to release a lock. Some locks are created automatically by the system and thus do not require explicit creation requests. In particular, the system automatically creates room entry locks, and session join and terminate locks. Room locks are created during server startup, and session locks are created when the session is started, i.e., when the first user joins the session.

FIG. 9 shows an exemplary message sequence involved with obtaining information to update a Demon. For example, when a Demon enters a room the control logic 225 will likely want to know the room-specific state, such as the users in the room, the current sessions in the room, and the participants of the sessions. To do so, Demon 1 sends a ROOM_INF_GET message to the server 240. The server maintains copies of room-specific information and responds with a ROOM_INF_DAT message, containing the room-specific data.

FIG. 10 shows an exemplary message sequence involved with detecting crashed Demons. The server periodically sends ALIVE_DEMON_ASK message, and rooms are expected to respond with ALIVE_DEMON_ANS messages.

FIG. 11 shows an exemplary message sequence involved with sending an application-specific message. Demon 1 sends an EVENT message to the server. The server, in turn, sends an EVENT message broadcast to all demons with applications in the same session.

5. Server

Figure 12:
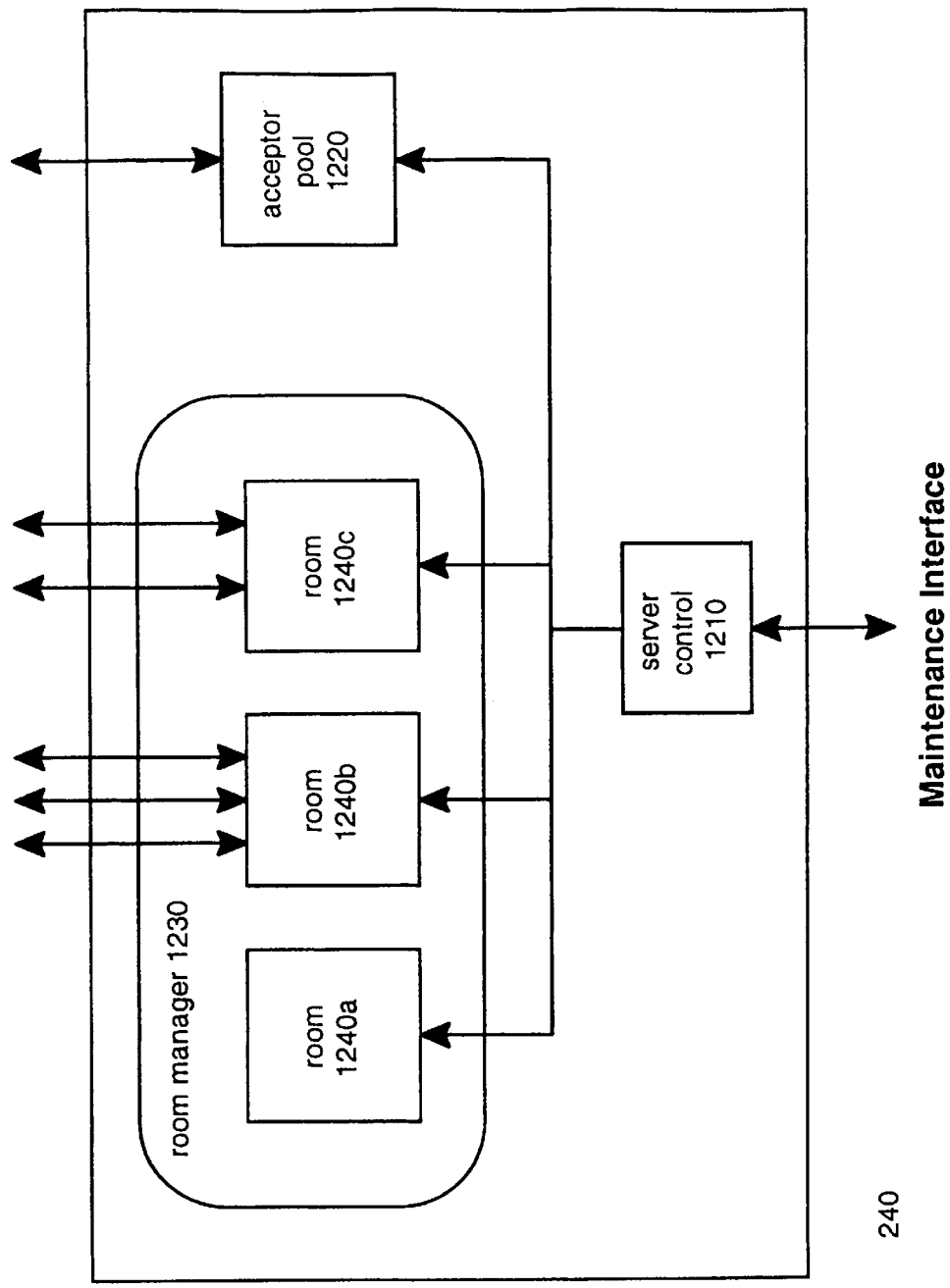
FIG. 12 is an architectural diagram of an exemplary server.

An exemplary embodiment of the server logic 240 has the architecture shown in FIG. 12. The server logic 240 includes a server control module 1210, an acceptor pool module 1220, a room manager module 1230, and at least one room module 1240 in the room manager 1230, though in this example three modules 1240*a*–1240*c* are shown.

Server control 1210 controls operation of the server logic. In particular, server control 1210 enables an administrator to control operation of the system. A special administrator interfaces is provided that uses a text based protocol to allow an administrator to browse and modify the state data. In particular, the administrator has access to server information (e.g., timeout values, buffers); room information (e.g., names of supported rooms); user information (e.g., user names); session information (e.g., SIDs and participants); variable and lock information (e.g., list of variables and state); operation information (e.g., list of operations and their state (more below)); and log content. The administrator may delete users, sessions, operations, and set server parameters. It may also force the system to reconfigure or cause the server to shut down. All of the above is implemented with logic in server control that cooperates with logic in the room manager 1230 and room modules, e.g., 1240*a*.

Acceptor pool 1220 accepts connections from the demons. As outlined above, entry into a room is not immediate. While permission for entry is being negotiated with the demon holding the entry lock, the acceptor pool 1220 contains the relevant information for the room entry request. When a user is allowed to finally enter a room, the structures that control the connection with that user are moved to a corresponding room module 1240. Only one acceptor pool module exists in a running server.

Room manager 1230 is a container object that stores all room modules 1240 and enables access to them. It also provides support for server broadcast and maintains variables and locks of server scope. Only one such module exists in a running server. There is one room module 1240 for each room serviced by the server. The room module is created during server start-up and exists even if the room is empty.

Figure 13:
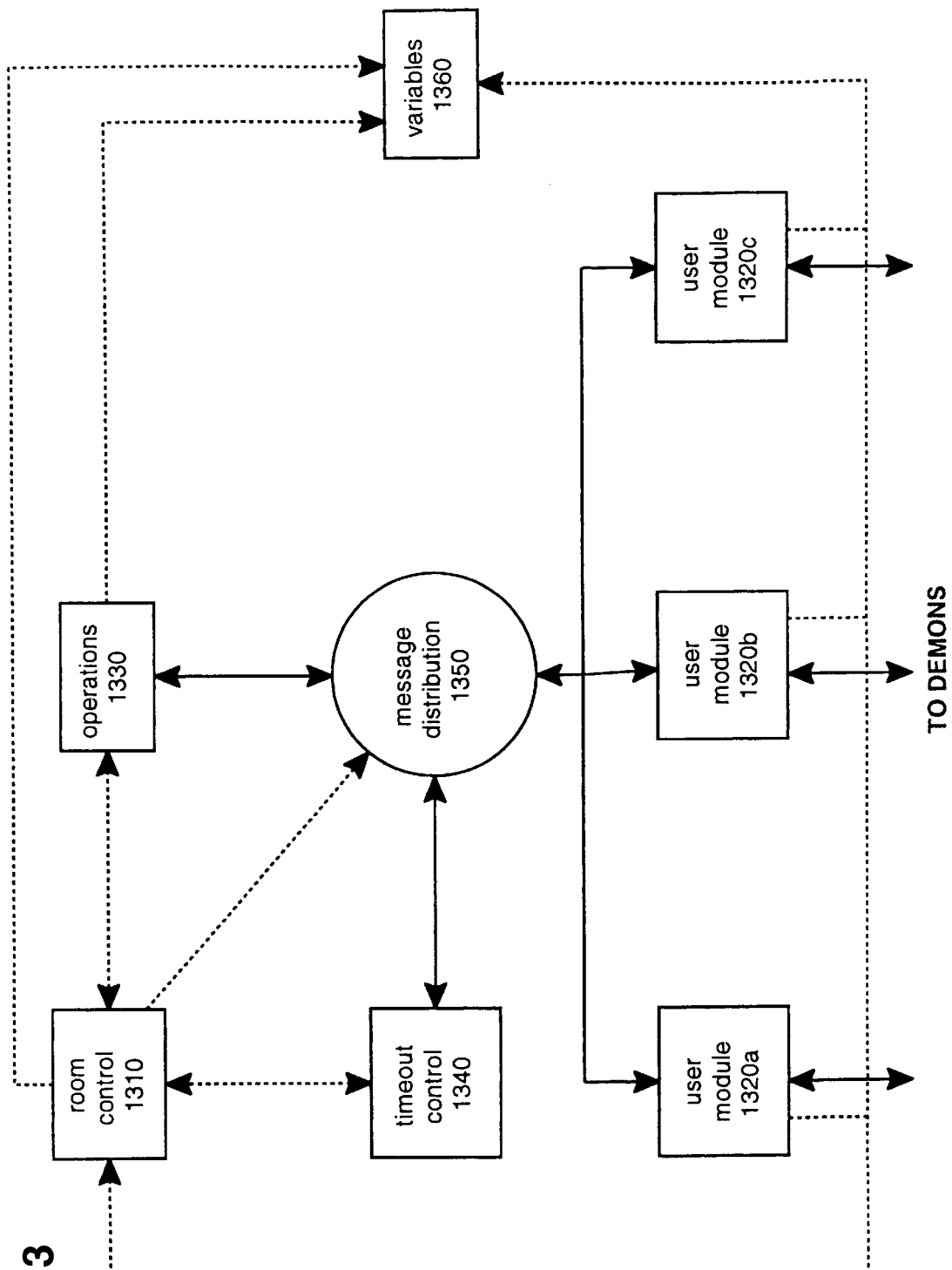
FIG. 13 is an architectural diagram of an exemplary room module.

Room module 1240 represents a room. All data and functionality necessary for execution of operations that are specific to the room are concentrated here. FIG. 13 shows the sub-module architecture of an exemplary room module 1240. In the figure, solid lines denote the flow of messages, and dashed lines denote an access and modification relationship; for example, a user module 1320 may access information in room control module 1310 and update system state.

Each room module includes a room control module 1310, an operations module 1330, a timeout control module 1340, a message distribution module 1350, a variables module 1360, and a number of user modules equal to the number of users currently in the room.

The room control module 1310 maintains room-state, such as (a) the room name; (b) sessions data, which describes the sessions established in a room, including session names and identifications (SIDs); (c) user data, which describes the users in a room, including their identifications (UIDs); (d) application data, which describes the applications run by the users, including their application group, subtype, and identification (AID); and (e) predefined sessions data, which describes predefined sessions associated with the room.

The operations module 1330 manages protocol "operations." An operation is one of the collaborative actions that involve relatively sophisticated transactions and maintenance of transaction state. For example, some of the actions involved asking for permission from other entities. The operations module would keep track of the various wait states and the like. Each operation has a corresponding identification (OID). In this fashion, a given demon may have two or more outstanding operations, as the operations module will distinguish messages based on the OID to which the messages are associated. The operation identification is included in the messages so that the state of the operation may be maintained and updated properly.

The operations module 1330 contains operation handlers, one for each operation outstanding. Each operation handler belongs to one of the following types:

1. Room_Enter: controls room enter procedure
2. Exec_Start: controls joining and creating the session
3. Exec_Terminate: controls leaving and deleting the session
4. Var_Lock: controls change of the shared lock or shared variable lock mode Each operation object, besides containing an OID, and besides being of a certain type, also includes operation state. This state includes the ID of the initiator of the operation and the operation stage. The operation stage effectively indicates the state of the operation, e.g., waiting for an Answer message of a given type.

Moreover, given types of operation objects may contain other information. For example, the operation logic for starting an application includes information about the target user identification (e.g., DUID), the SID, the session name, and the application group and subtype. It will also support four specific stages: (1) Init state; (2) START_ANS_WAIT state, while waiting for the target user's answer; (3) JOIN_ANS_WAIT state, while waiting for the answer from the user that holds the join lock; and (4) START_NOT_WAIT state, while waiting for the notification message from the target user. The description of other operation logic will be evident from the description of the protocol (including the Appendix) in conjunction with the above example.

More specifically, ROOM_ENTER_REQ and ROOM_ENTER_ANS messages are handled by the operations module of the target room. EXEC_START_REQ, EXEC_JOIN_ANS, EXEC_START_ANS, and EXEC_START_NOT messages are handled by the operations module of the requesting room using the Exec_Start operation object. EXEC_TERMINATE_REQ, EXEC_TERMINATE_ANS, and EXEC_TERMINATE_NOT are handled by the operations module of the requesting room by an Exec_Terminate operation object. VAR_LOCK_REQ and VAR_LOCK_ANS are handled by the operations module by a Var_Lock operation object.

The timeout control module 1340 detects crashed demons. It handles ALIVE_DEMON_ANS messages from the demons to detect unresponsive demons and sends ALIVE_DEMON_ASK messages to all demons in a room. If any demon 320 does not respond for a specified period, the timeout control module assumes that a crash has occurred and notifies the room control module 1310.

The message distribution module 1350 passes messages from a source module to a destination module(s). With regard to scheduling, each user module includes two threads of execution: one for incoming messages, and the other for outgoing messages. Thus, the actual scheduling algorithm will depend on the scheduling algorithm of the underlying operating system. The distribution module 1350 has several modes of message distribution, described below.

Messages coming from a demon are received by a user module 1320 and may be forwarded to the message distribution module 1350 for further routing, e.g., to the operations module. In particular, incoming messages may take the following routes:

user module 1320a; for example, purely room-level activity.
user module 1320a→message distribution 1350→operations 1330; for example, a message that is a part of an operation.
user module 1320a→message distribution 1350→timeout control 1340; for example, an ALIVE_DEMON_ANS message.

Outgoing messages, on the other hand, may be transmitted in one of several modes, including (a) server broadcast; (b) room broadcast; (c) session broadcast; and (d) unicast.

The server 240 supports a server broadcast for notification about events that affect all users connected to a server. In this case, the room manager module 1230 sends an outgoing message to the message distributor module 1350 in each room, which causes a room broadcast for that room.

Room broadcast is used to notify users about changes in the state of a room. The operations module 1330 or the user module 1320 may initiate room broadcast. For example, the operations module may want to send a message that a session was created. Each user module, in turn, will send the message to the corresponding destination demon.

Session broadcast is used to send shared application events to all members of a session. Any user module in a room may initiate this transmission. For example, the operations module may want to send a message a user has joined a session.

Unicast is used to send a message to a specific user. All acknowledgment, action and query messages to a demon 320 are sent using this mode. The operations module 1330, timeout module 1340, or any user module 1320a may initiate this message mode.

The dashed lines of FIG. 13 represent access and modification relationships, indicating which modules may access and modify information in another module. These relationships include user module→room control: user module accesses room control data about users and sessions; user module notifies room control about modification to room state data, resulting from handling protocol messages.

operations→room control: operations accesses room control data as necessary for protocol handling operations; operations notifies room control about modification to room state data, resulting from execution of protocol operations; room control notifies operations about changes of user state, e.g., crashed demon.

Room control→operations: room control notifies operations about changes of user state, e.g., crashed demon.

user module→variables: user module access variables and locks; user module requests modification of values as a result of protocol message handling.

operations→variables: operations accesses variables; requests modification of values as a result of protocol message handling.

timeout control→room control: timeout control notifies room control about crashed demon; room control notifies timeout control changes in user state.

room control→variables: room control notifies variables module about changes in room state.

room control→message distribution: room control notifies message distribution of changes in room state.

The variables module 1360 stores variables and locks that are created by applications executed by the users present in a room. It also provides logic for accessing and modifying those variables and locks. The shared lock state includes (a) the name; (b) the scope, including the scope-type, e.g., server, room, or session, and a scope identifier, such as a room name or SID; (c) the owner of the lock; (d) ask/answer flag, indicating whether application that holds lock in X mode is asked when another application attempts to acquire the lock; (e) lock mode, including exclusive (X), shared (S), and neutral (N); and (f) list of applications that currently hold the lock (i.e., in S mode there may be multiple holders).

The owner of the lock is used to define the lifetime of the lock. When the owner is deleted all the locks or variables owned by the owner are also deleted. A shared variable or lock, for example, may be owned by a session or user. It is specified when the lock is created and cannot be changed later.

The holder parameter defines who currently has the lock or shared variable in a specific state, e.g., S or X mode. These states are used to maintain coherency.

All locks, including those at server scope, have lifetimes defined by a combination of the scope and the owner type. This relationship is shown in table below.

| Scope | Owner Type | When Deleted |
|---|---|---|
| Session | Session (e.g., join) | the session ends |
| Session | User (e.g., application-specific) | the user leaves the session |
| Room | Session | the session ends |
| Room | User | the user leaves the room |
| Server | Session | the session ends |
| Server | User | the user logs out from the server |

There is one user module per user in a room. A user module, e.g., 1320a, communicates directly with one demon and implements part of the communication protocol between a server 240 and a demon 320. In particular, the user module includes handler logic to respond to relatively uncomplicated transactions, i.e., transactions that do not involve complicated state in the protocol. These messages include (a) ROOM_INF_GET; (b) ROOM_EXIT_NOT; (c) VAR_CREATE_REQ; (d) VAR_LOCK_GET; (e) VAR_VALUE_GET; and (f) VAR_VALUE_SET_REQ.

6. Demon

An exemplary demon 220 is responsible for (a) initialization and maintenance of the connection to the server; (b) user authentication; (c) starting applications; (d) terminating applications; (e) transmitting application messages; (f) generating and handling control messages; and (g) changing rooms.

An exemplary demon 220 is constructed as an applet embedded in an HTML page. This page is an "entry page" associated with the room. If the browser is used to visit this page, the demon is started and the procedure for entering the room is initiated. The loading of the page starts the initialization of the demon 220. As part of the loading and initialization, the demon applet reads parameters contained in the HTML page, one of which identifies the location of a room configuration file. The room configuration file includes the room name, the URL pointer of the server 240, the URL of a community configuration file, and a list of predefined applications for the room, including control logic for the room. The community configuration file in turn includes the name of the community, a list of rooms in the community, the login policy of the room, and the URL of a login applet to implement the login policy.

The demon reads the location of a login class from the community configuration file. The demon instantiates the class and calls the proper logic method. The login class waits for the user to provide data (e.g., username and password) and indicates to the demon that the data is available. The demon reads this data, compares it with a user authentication file in accordance with the user authentication policy specified in the community configuration file and decides whether it may proceed with entering the room. If the user is allowed in the room, the demon establishes a connection to the server, instantiates and connects to the control logic specified in the room configuration file, terminates the login class, and launches the predefined applications (including the issuing of the necessary request messages to the server).

A demon may receive a request to start an application from the server 240 or internally. For example, the server could send an EXEC_START_ACT to launch an application. Regarding internal requests, they may come from control logic that interacts with an end-user or as part of starting the predefined applications identified in the room configuration file. A request can fall under three categories: (a) a request for an external application (e.g., a ported application, for example, written in 'C' with socket calls to the demon); (b) a request for a stand-alone applet; or (c) a request for an embedded applet. (By way of example, a stand-alone applet gets its own frame. You can split a frame into multiple parts and embed an applet in each part. This makes it seem to a user like there is a single application, even though in fact there are multiple, each belonging potentially to its respective session.)

To start an external application, the demon starts the application, waits for it to register with the demon, and then creates a stub-module interface to communicate with the application (more below). The Java interface intended for starting system applications is used. As of version 4.x of Netscape, the java virtual engine allows starting normal system applications provided the applet is signed and has sufficient privileges. This is part of the standard java API. In the instant context, this facility is used by running the demon 220 at a sufficient security privilege allowing it to start applications. The demon gets a handle to a frame. The demon initializes the loading of the HTML document containing the applet into that frame. The demon extracts the handle to the applet from that frame and places the applet in its final frame. The final frame may be either stand-alone frame (e.g., derived from java.awt.Frame class) or in an embedded frame (in the case of an embedded applet). The embedded frame is a space reserved for an applet inside a HTML document. This involves opening a new browser frame, loading a HTML document there that contains the some dummy applets, waiting for the dummy applets to register, removing those dummy applets from their placeholders and placing in those placeholders new embedded applets.

As part of starting an application, the demon performs the following. Before starting an application for itself, the demon sends a Start Request to the server and expects to receive an Act and Ack message. For applications that are not supposed to exist for multiple sessions, e.g., control logic, special procedures are necessary that weren't explained above. Specifically, the SID field is loaded with an indicative value, e.g., −2, and the name of the session is supplied in the session name field. This tells the server to add the new application to the session identified by the name.

An application may be terminated (a) by the user who holds the terminate lock to the session in exclusive mode (X mode) or (2) by the system. For example, the first case happens when one user decides to close the application belonging to another user, and the second case happens when the user presses some form of terminate control. There are many other causes for terminating an application.

If the termination was initialized by a local user, the demon 220 is informed about this intention from the control logic 225 or from the application, and the demon sends a notification message to the server.

If the termination was initialized by a remote user, the demon 220 receives a message from the server 240 asking the demon to terminate an application. This message is forwarded to the control logic, which causes the demon to send an Answer message with the answer. If the control logic decides to terminate the application, the demon sends a termination message to the application logic to cause it to quit.

For application messages arriving from the server, the demon 220 receives a message, having a SID, which allows the demon to pass the message to the relevant applet or application stub. To this end, the demon includes a mapping data structure to map SIDs to different communication interfaces. Control types, on the other hand, are used to distribute control messages.

In the opposite direction, a message is taken from an applet's or application's communication interface and passed to the server.

The demon, analogously to the server, is responsible for handling certain messages. For example, a demon may be asked for permission to terminate an application. To this end, the demon also implements operations. Upon receiving a message, the demon will forward the message to the relevant entity and wait for a response, e.g., an Answer. The response, from the relevant entity, will contain the identifier of the operation, and the demon will use this information to construct a message back to the server.

The demon includes logic to support room change requests by a user. When changing rooms, all applications of the current room are closed and a new set of application belonging to the new room is launched. The demon consults the room-specific configuration files to determine which applications should be launched as part of entering a new room, and later, if entry is allowed, it uses room information to obtain the room state. If the room change is to another room in the same community, no authentication is performed. If not, the demon must determine whether the user is permitted to enter the new room. The applications in the old room may be kept in a pool of applications, if the applications were registered with a Restartable content-type. This allows faster start-up, if the user decides to launch these applications again.

Architecture

The way the applet is connected to the demon 220 is entirely transparent to the applet logic and is determined by the context in which it will run, e.g., Navigator environment. This allows an applet to be executed either as an embedded applet or as a stand-alone applet. Or, to put this another way, the application developer need not be concerned with whether the eventual logic will be implemented as an embedded or stand-alone applet. This decision is instead left to the room developer.

Figure 14:
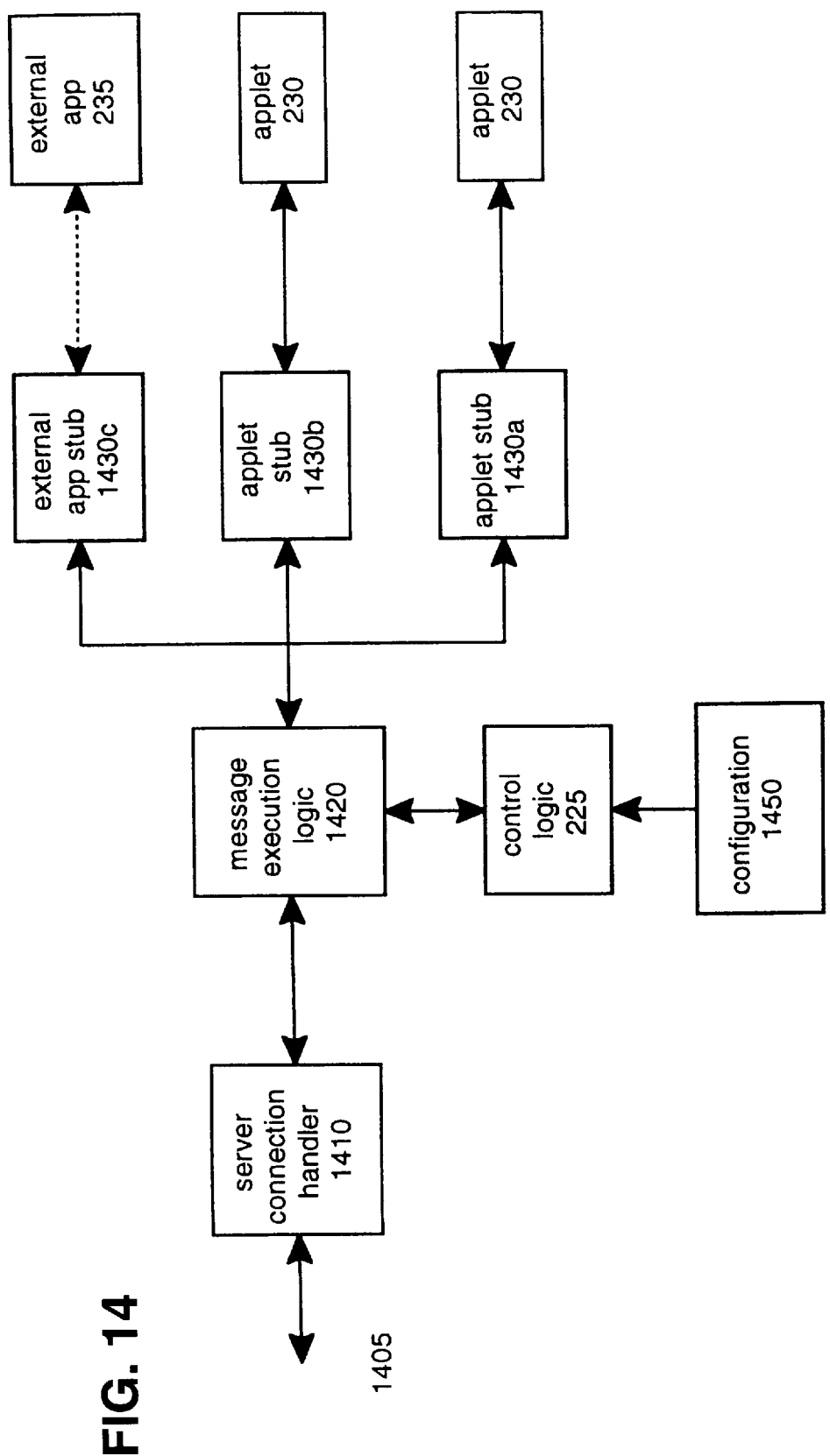
FIG. 14 is an architectural diagram of an exemplary demon.

FIG. 14 shows an exemplary client architecture. Demon 220 includes server connection handler 1410; message execution logic 1420; and application stubs 1430a–c. These entities in turn operate with the control logic 225, configuration file(s) 1450, and application logic 230 and 235.

The server connection handler 1410 is responsible for maintaining the connection to the server. It listens on the connection 1405, and when a message arrives, it creates a corresponding message object and passes it to the message execution logic 1420. Likewise, it listens for messages from the logic 1420 and forwards any such messages to the server.

As part of the above, the server connection handler is responsible for creating message objects from an arriving stream of bytes from the server, and for creating a stream of bytes to be sent to the server from a message object sent by the message execution logic 1420.

The message execution logic 1420 provides communication inside the client. It is connected to control logic 225 and application stubs 1430a–c via a method-based interface. It is also connected to the server connection handler by an internal method based interface. Each message class, from which message objects are created, has certain behavior associated with it. This behavior is triggered by invoking an "execute" method on the message object. The message execution logic is primarily responsible for triggering the behavior of the message objects.

In the case of control messages, the execute logic may need to forward the message to another entity such as the control logic (it depends on the control message). In such a case, the execute logic creates a list of stubs that should receive the message from the registered interests. The appropriate method on those stubs is then called. (The appropriate method will mirror the message, e.g., Var_Lock_Dat). For event messages, the execute method includes logic for determining the correct applications stubs, based on the SID in the message, and calling the method event( ) on those stubs with the remaining data contained in the message argument.

The application stubs 1430 provide a level of abstraction for the demon. The message execution logic need only understand the interface to the stubs 1430a–c, whereas the stubs on the application-side implement a method-based or socket-based interface, depending on the nature of the application logic. During startup, the control logic identifies the nature of the application logic and causes the environment to instantiate the appropriate stub as part of starting up the application.

An external application stub, e.g., 1430c would use sockets to communicate with the external application 235 An applets stub, e.g., 1430b, would use method calls to communicate with applet 230.

The control logic 225 handles and generates control messages for the server and from the stubs. It also maintains room-specific state, which may be accessed by the application logic. This state includes (a) the sessions in the room; (b) information about the applications in a session, such as the application group; (c) information identifying the entity that started a session; and (d) information relating the users to applications. The control logic will handle the corresponding user interface and handle any actions resulting from the control, such as launching an application, or joining a session. The control logic is also the entity responsible for responding to polls to see if the demon is still alive, and pools applications on room changes.

Configuration entity 1450 is shown as a single entity but may result from several files, e.g., the room configuration file, community configuration file, etc. The information provided is used to help describe the room-specific look and feel, the community-common authentication procedures, the predefined applications and the like.

7. Miscellaneous

Under the above embodiments, the collaborative backbone included the demon logic 220 and the server logic 240. Other embodiments would include default versions of control logic. In this sense, the collaborative backbone provides the logic for supporting collaborative actions such as session management and floor control and provides the mechanisms for application logic to distribute events to other relevant entities and for applications to share critical data in a coherent manner.

Under the above embodiments, the collaborative framework referred to the well-defined demon API to which applications may communicate. Developers would refer to this API when creating new collaborative applications or room-specific control logic, but would not need to know the internal details of the collaborative backbone. Likewise, developers interested in porting existing applications would refer to the API in a similar manner. When porting an existing application, the developer would need to insert calls to the backbone, as needed, to cause the distribution of events or the use of locks and shared variables. There is no requirement by the system that an application distribute all events occurring in the application; instead the developer determines which events need to be distributed. Likewise, there is no requirement that the applications operate from the same data model or to make the same changes to a data model in response to shared events. It is entirely application dependent, making the system extremely flexible. In this regard, the room or session developer causes application logic to register interest according to control types and SIDs. Many alternative arrangements are easily foreseeable given the above teachings, such as more or less granular control types.

Moreover, many of the Web-based technologies used in the exemplary embodiment were particularly relevant to the Netscape Navigator environment. Alternative embodiments would use corresponding entities in other technological environments, such as those associated with the Explorer browser, available from Microsoft Corporation.

To save network bandwidth, control logic 225 may maintain data structures reflecting the relevant state of the system, such as the members in a room and the sessions in a room. Technically, however, there is no requirement for such local copies at the demon, since the server maintains the state. Keeping a local copy is essentially a trade-off between consuming network bandwidth and allocating memory at the client to hold the data. Alternative, light-weight embodiments of the demon may find it useful to rely on the server's state only and not keep local copies.

Likewise, many variants of the protocol are easily foreseeable. For example, different actions may be implied from different responses and answers. One such example would involve the server automatically requesting the release of a lock if a set variable request determined that the requester did not hold the lock in a sufficient state. Another example would include implied ACKs in _INF messages.

Another variant might include mechanisms for an application to determine the underlying transport protocol for different types of messages. For example, a variant might allow applications to specify that event messages should be distributed under a UDP, as opposed to a TCP protocol, if performance were more critical than reliability of receiving all events.

Having described an exemplary embodiment, it should be apparent to persons of ordinary skill in the art that changes may be made to the embodiment described without departing from the spirit and scope of the invention.

What is claimed is:

1. A collaborative backbone, comprising:
   demon logic embedded in a room page as downloadable platform-independent instructions, the demon logic including
      first logic to identify, download, and launch control logic associated with the room page, the first logic including logic to establish a communication path between a downloaded demon and downloaded control logic;
      second logic to identify and launch an application associated with the room page, including logic to establish a communication path between a downloaded demon and a launched application;
      third logic to identify a server associated with the first room and to establish a communication connection between a downloaded demon and the server;
      fourth logic to receive messages from a launched application and downloaded control logic and to forward the messages to the server;
      fifth logic to receive messages from the server and to cause at least a portion of the message to be routed to a relevant entity as determined by information in the message, the relevant entity being from a set including the downloaded control logic and the launched application;
   a server including
      sixth logic to establish communication connections with demons;
      seventh logic to maintain system state, including a list of associations identifying demons in a room;
      eighth logic to receive a message from a demon, to consult the system state, and, in response to the consultation, to forward a message to other relevant demons as determined by the system state, such that a plurality of clients may access the room page to cause the demon logic to download at respective clients and to form a first collaborative session of interacting instances of the application.

2. The backbone of claim 1 wherein the control logic is implemented in platform-independent instructions.

3. The backbone of claim 1 wherein the second logic includes logic to download and launch an application implemented in platform-independent instructions.

4. The backbone of claim 3 wherein the second logic includes logic to launch an application as a stand-alone applet.

5. The backbone of claim 3 wherein the second logic includes logic to launch an application as an embedded applet.

6. The backbone of claim 1 wherein the second logic includes logic to obtain the application and to launch it as an external application that executes in a different context than the downloaded demon logic.

7. The backbone of claim 6 wherein downloaded demon logic executes in a browser environment and wherein the launched application executes externally to the browser environment.

8. The backbone of claim 1 wherein downloaded control logic and a launched application have logic to register communication interests with a downloaded demon, and wherein the fifth logic routes the at least a portion of a message based on the registered interests of the downloaded control logic and the launched application.

9. The backbone of claim 1 wherein a downloaded demon and server communicate using a predefined protocol of control messages and application events, and wherein the control messages include a group of messages to allow a first client to launch a second application and include it in the room, and to allow a second client to join a second collaborative session of interacting instances of the second application.

10. The backbone of claim 1 wherein a downloaded demon and server each have logic to communicate according to a predefined protocol having control messages and application events, wherein an application is characterized by an application group and an application subtype, wherein the application group specifies compatibility at an application event level, wherein a first client may cause its associated demon logic to launch an application instance characterized by a first group and a first subtype and wherein a second client may cause its associated demon logic to launch another application instance characterized by the first group and a second subtype, wherein the third and fourth application instances are dissimilar, and wherein the third and fourth applications are in communication with one another using the predefined protocol to form a third collaborative session.

11. The backbone of claim 1 wherein a downloaded demon and server each have logic to communicate according to a predefined protocol having control messages and application events, wherein the downloaded control logic and launched application have logic to register their respective interest with a downloaded demon according to a specified control type selected from a set of control types, wherein each control type corresponds to a set of messages from the control messages, and wherein the downloaded control logic and launched application specify their respective interest in receiving application events according to a session identifier associated with the session causing the application events.

12. The backbone of claim 1 wherein a downloaded demon and server each have logic to communicate according to a predefined protocol having control messages and application events, wherein the system state includes information identifying downloaded demons from which permission is needed to institute certain actions and wherein the eighth logic includes logic to consult the system state to determine whether a control message, received by the server, requires permission from another demon and, if so, to negotiate for permission from the other demon.

13. The backbone of claim 1 wherein a downloaded demon and server each have logic to communicate according to a predefined protocol having control messages and application events, wherein the control messages include groups of messages including (a) room management messages for managing entry and exit into a room by a client; (b) session management messages for managing starting and terminating of applications by a client; (c) information messages for distributing system state to relevant demons; and (d) variable and lock messages for allowing applications and control logic to share state in a coherent manner.

14. The backbone of claim 1 wherein a downloaded demon and server each have logic to communicate according to a predefined protocol having control messages and application events, wherein the control messages include a message in which a client at a first computer node can request the launching of an application at a second computer node.

15. The backbone of claim 1 wherein a downloaded demon and server each have logic to communicate according to a predefined protocol having control messages and application events, wherein the control messages include a message in which a client at a first computer node can request the terminating of an application at a second computer node.

16. The backbone of claim 1 further comprising an HTTP server holding a first downloadable application, the HTTP server residing at a different computer node than the server, wherein the second logic includes logic to download and launch an instance of the first application.

17. The backbone of claim 16 further comprising a second HTTP server holding a second downloadable application, the second HTTP server residing at a different computer node than the server and the HTTP server, wherein the second logic includes logic to download and launch an instance of the second application, and wherein the first application may cause its demon to send messages via the server to cause the first and second applications to collaborate.

18. The backbone of claim 17 wherein the first and second application are compatible at a message-level.

19. The backbone of claim 18 wherein the first and second application have dissimilar logic.

20. The backbone of claim 1 wherein downloaded control logic includes logic to change from the room page to another room page, wherein the room page and the other room page each specify an associated community specifying user authentication procedures, and wherein the logic to change rooms includes logic to determine whether the other room and the room specify the same community and to invoke the user authentication procedures of other new room if the other room specifies a different community than that specified by the room.

21. The backbone of claim 1 wherein a downloaded demon and server each have logic to communicate according to a predefined protocol having control messages and application events, wherein the control messages include message to create, read, and write shared system state in a coherent manner.

22. The backbone of claim 21 wherein the shared system state is creatable with specifiable life-spans and wherein the server includes ninth logic to detect when the life-span of shared system state has expired.

23. A method of having a first and a second application instance collaborate within a virtual room, the method comprising the steps of:
  (a) accessing a room page having downloadable demon logic embedded therein to cause the demon logic to download and execute at a client node;
  (b) the downloaded demon logic at the client node identifying the first application and launching an instance thereof and creating a communication path between the first application instance and the downloaded demon logic;
  (c) the downloaded demon logic at the client node causing a communication connection to be formed with a server having logic to communicate according to a predefined protocol;
  (d) accessing a room page having downloadable demon logic embedded therein to cause the demon logic to download and execute at another client node;
  (e) the downloaded demon logic at the other client node identifying the second application and launching an instance thereof and creating a communication path between the second application instance and the downloaded demon logic;
  (f) the downloaded demon logic at the other client node causing a communication connection to be formed with the server;
  (g) the first and second application instances causing their associated downloaded demon logic to communicate according to the predefined protocol.

24. The method of claim 23 wherein the first and second application instances are compatible at a message-level.

25. The method of claim 24 wherein the first and second application instances have dissimilar logic.

26. The method of claim 23 wherein step (b) downloads the first application from a first HTTP server and launches it as an applet.

27. The method of claim 26 wherein the applet is launched as a stand-alone applet.

28. The method of claim 27 wherein the applet is launched as an embedded applet.

29. The method of claim 26 wherein step (e) downloads the second application from a second HTTP server and launches it as an applet, wherein the first and second HTTP servers are from different namespaces.

30. The method of claim 23 further comprising the steps of
   (h) a client requesting the launching of an application at another node by sending a request message to the server;
   (i) the server asking a downloaded demon at the other node if the application may be launched at that node;
   (j) the downloaded demon at the other node answering the server;
   (k) the server sending an response message to the client indicating whether the application was launched.

31. The method of claim 30 further comprising the steps of the server, responding to an affirmative answer from the other node by issuing an act message to the downloaded demon at the other node, and the downloaded demon sending a notification message to the server when the application is launched, and wherein step (k) is issued in response to the notification.

32. The method of claim 23 further comprising the steps of
   (l) a client requesting entry into a new room from the server;
   (m) the server sending a response to the client indicating whether entry is permitted;
   (n) the server sending an informational message to any other demons in the new room indicating that the downloaded demon associated with the client has entered the new room.

33. The method of claim 32 further comprising the steps of:
   (o) the server consulting system state and determining that another demon controls entry into the new room;
   (p) the server asking the other demon if the demon may enter the room;
   (q) the other demon answering the server;
   (r) the server sending a response to the demon.

34. The method of claim 32 further comprising the step of the demon determining whether the new room and a prior room belong to a same community and if not accessing community configuration information to determine whether the client is permitted entry into the new room.

35. The method of claim 23 wherein the predefined protocol implements collaborative actions by having
   (s) a demon requesting the collaborative action;
   (t) the server responding to the demon request;
   (u) the server informing all other relevant demons if the action causes a change to system state maintained by the sever and relevant to the other demons.

36. The method of claim 35 further comprising the steps of
   (v) the server consulting system state to determine whether permission is needed from another demon to allow the request;
   (w) the server asking the other demon for permission;
   (x) the other demon answering the server, indicating whether the action is permitted;
   (y) the server sending an action message to a demon at which collaborative action is requested to trigger the action;
   (z) the demon receiving the action message sending notification to the server indicating whether the action occurred.

37. The method of claim 23 further comprising the steps of
   (aa) the server sending an alive ask message to demons with which it has a communication connection;
   (bb) responsive demons replying with an alive answer message;
   (cc) the server detecting which demons have not replied to step (bb).

* * * * *